United States Patent
Slaughter, Jr. et al.

(10) Patent No.: US 6,254,275 B1
(45) Date of Patent: *Jul. 3, 2001

(54) SEALED BEARING DRILL BIT WITH DUAL-SEAL CONFIGURATION AND FLUID-CLEANING CAPABILITY

(75) Inventors: Robert H. Slaughter, Jr., Ponca City; Peter Cariveau, Stillwater; Roger Didericksen, Ponca City, all of OK (US)

(73) Assignee: Smith International, Inc., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/980,935

(22) Filed: Dec. 1, 1997

Related U.S. Application Data

(63) Continuation-in-part of application No. 08/574,793, filed on Dec. 19, 1995.

(51) Int. Cl.⁷ .................................................. F16C 31/00
(52) U.S. Cl. ............................................ 384/92; 175/369
(58) Field of Search .................................. 384/92, 94, 95, 384/96; 175/367, 368, 369, 371, 372

(56) References Cited

U.S. PATENT DOCUMENTS

| | | |
|---|---|---|
| 2,960,313 | 11/1960 | Goodwin . |
| 3,268,018 | 8/1966 | Neilson ................................ 175/318 |
| 3,746,405 | 7/1973 | Welton . |
| 3,746,446 | 7/1973 | Neilson . |
| 3,921,735 | 11/1975 | Dysart ................................. 175/337 |
| 3,990,525 | 11/1976 | Penny .................................. 175/337 |
| 4,092,054 | 5/1978 | Dye . |
| 4,102,419 | 7/1978 | Klima .................................. 175/371 |
| 4,168,868 | 9/1979 | Shields . |
| 4,176,848 | 12/1979 | Lafuze . |
| 4,179,003 | 12/1979 | Cooper et al. ......................... 175/371 |
| 4,183,417 | 1/1980 | Levefelt .............................. 175/339 |
| 4,200,343 | 4/1980 | Highsmith . |
| 4,249,622 | 2/1981 | Dysart ................................. 175/227 |
| 4,252,330 | 2/1981 | Crow .................................... 277/92 |

(List continued on next page.)

FOREIGN PATENT DOCUMENTS

| | | |
|---|---|---|
| 2 300 931 | * 9/1976 | (FR) . |
| 2019921 | 11/1979 | (GB) . |
| 2045315 | 10/1980 | (GB) . |
| 2045838 | 11/1980 | (GB) . |
| 574515 | 9/1977 | (SU) . |
| 641062 | 1/1979 | (SU) . |

OTHER PUBLICATIONS

Photographs of 15 inch MXM dual deal drill bit Manufactured by Superior Rock Bit Company, Virginia, Minn. And obtained by Applicant on May 23, 1996; (12 p.).

*Primary Examiner*—John P. Darling
(74) *Attorney, Agent, or Firm*—Conley, Rose & Tayon, P.C.

(57) ABSTRACT

A drill bit for use in an earthen annulus that contains loose particles is connected to a fluid supply source and includes a bit body having at least one journal segment and at least one fluid conduit in fluid communication with the fluid supply source. A roller cone is rotatably mounted upon the journal segment and forms at least one bearing cavity therebetween. An annular primary seal is disposed between the roller cone and the bit body and between the bearing cavity and the earthen annulus, and an annular gap is disposed between the annular primary seal and the earthen annulus. The annular gap is in fluid communication with the fluid conduit and the earthen annulus. An annular secondary seal is disposed between the annular primary seal and the earthen annulus and is capable of substantially preventing the ingress of debris from the earthen annulus to the annular primary seal.

18 Claims, 18 Drawing Sheets

U.S. PATENT DOCUMENTS

| | | |
|---|---|---|
| 4,253,710 | 3/1981 | Goodman . |
| 4,256,351 | 3/1981 | Langford, Jr. . |
| 4,277,109 | 7/1981 | Crow . |
| 4,284,310 | 8/1981 | Olschewski et al. . |
| 4,375,242 | 3/1983 | Galle ................... 175/228 |
| 4,427,307 | 1/1984 | Norlander et al. ............ 384/93 |
| 4,453,836 | 6/1984 | Klima ................... 384/94 |
| 4,515,228 | 5/1985 | Dolezal et al. ............ 175/313 |
| 4,552,233 | 11/1985 | Klima ................... 175/371 |
| 4,629,338 | 12/1986 | Ippolito ................... 384/94 |
| 4,641,976 | 2/1987 | Kar ................... 384/95 |
| 4,657,091 | 4/1987 | Higdon ................... 175/229 |
| 4,688,651 | 8/1987 | Dysart ................... 175/371 |
| 4,722,404 | 2/1988 | Evans ................... 175/371 |
| 4,722,615 | 2/1988 | Bailey et al. ............ 384/96 |
| 4,756,631 | 7/1988 | Jones ................... 384/95 |
| 4,762,189 | 8/1988 | Tatum ................... 175/371 |
| 4,793,719 | 12/1988 | Crockett et al. ............ 384/92 |
| 4,838,365 | 6/1989 | Kotch ................... 175/371 |
| 4,875,532 | 10/1989 | Langford, Jr. ............ 175/371 |
| 4,880,068 | 11/1989 | Bronson . |
| 4,934,467 | 6/1990 | Langford, Jr. ............ 175/371 |
| 4,955,440 | 9/1990 | Chavez ................... 175/371 |
| 4,981,182 | 1/1991 | Dysart ................... 175/71 |
| 5,016,719 | 5/1991 | White ................... 175/353 |
| 5,027,911 | 7/1991 | Dysart ................... 175/57 |
| 5,360,076 | 11/1994 | Kelly, Jr. et al. . |
| 5,402,858 | 4/1995 | Quantz et al. ............ 175/371 |
| 5,441,120 | 8/1995 | Dysart ................... 175/228 |
| 5,452,771 | 9/1995 | Blackman et al. ............ 175/353 |
| 5,513,711 | 5/1996 | Williams ................... 175/57 |
| 5,513,715 | 5/1996 | Dysart ................... 175/371 |
| 5,518,077 | 5/1996 | Blackman et al. ............ 175/353 |

* cited by examiner

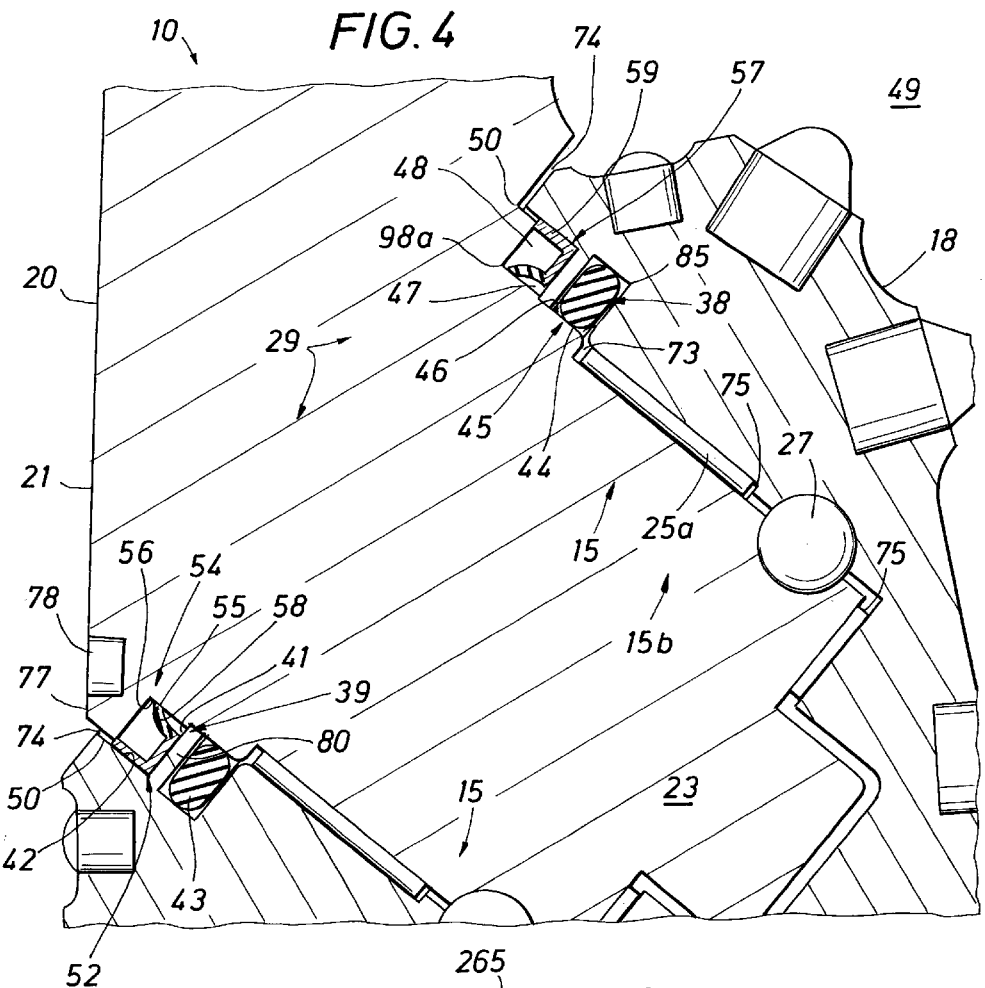
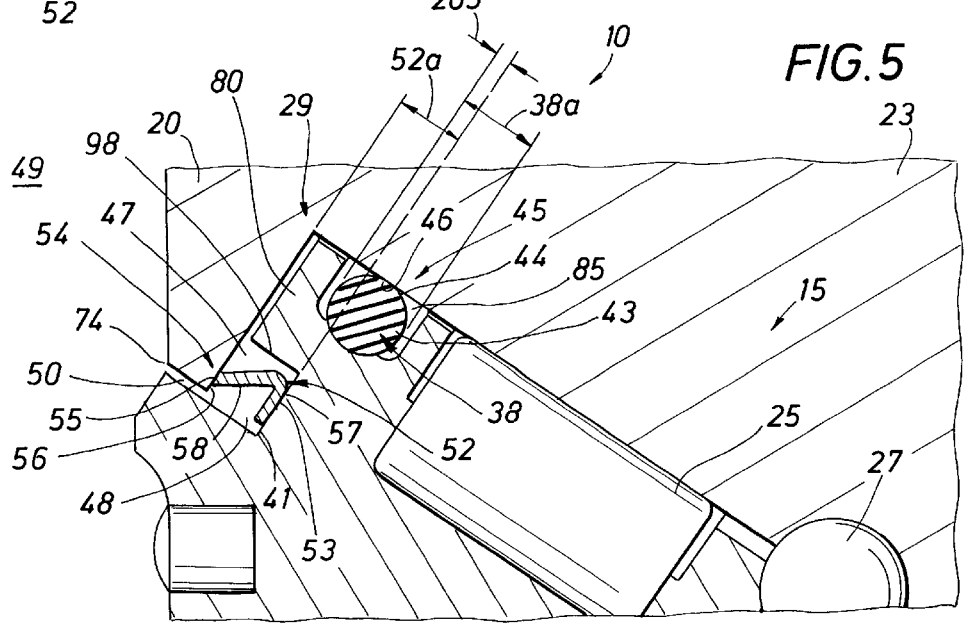

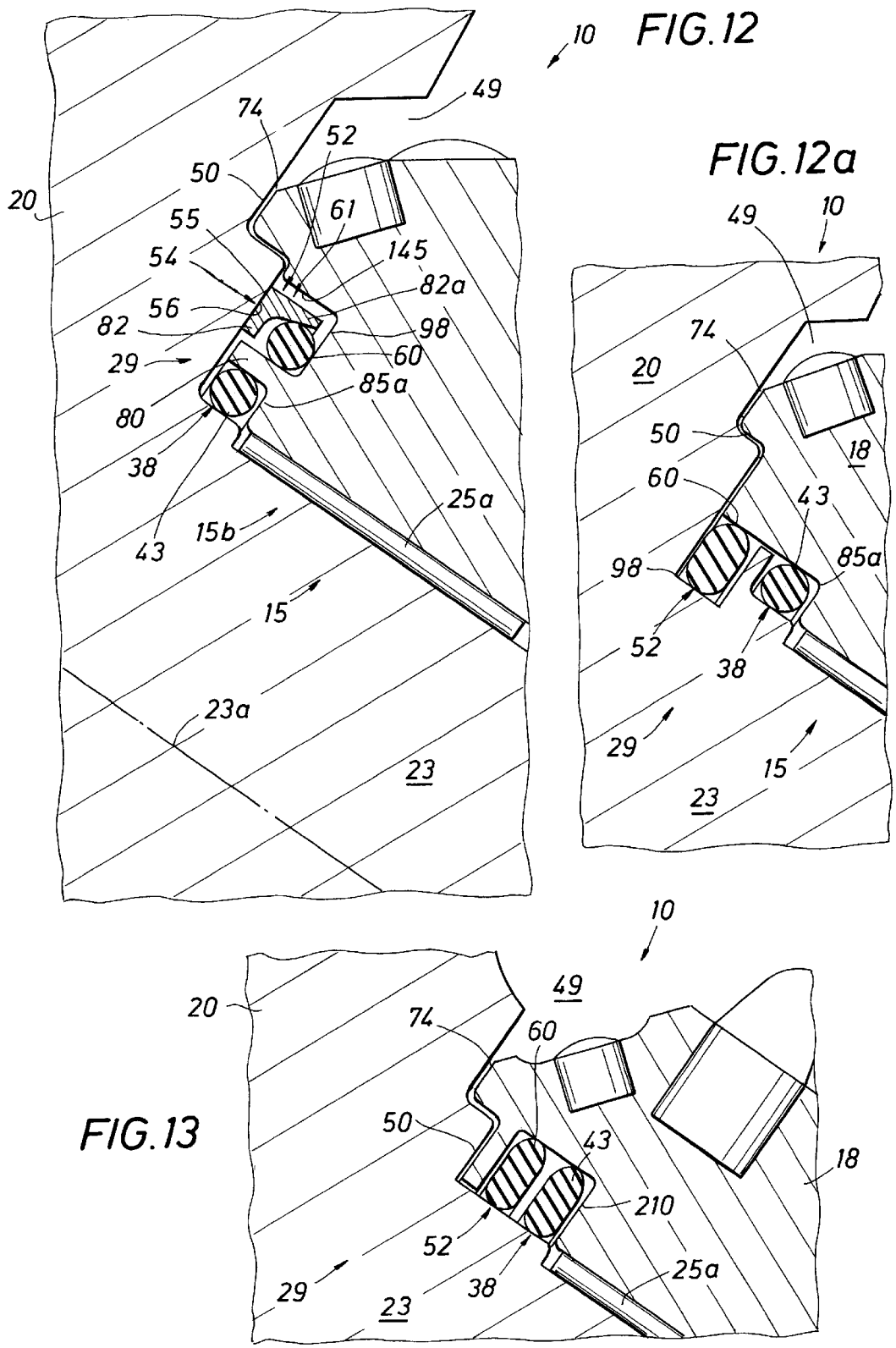

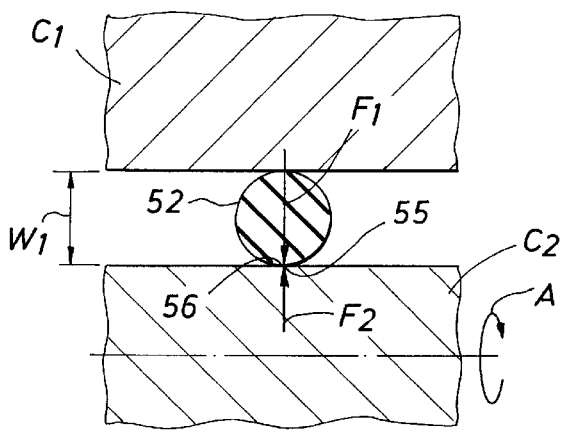
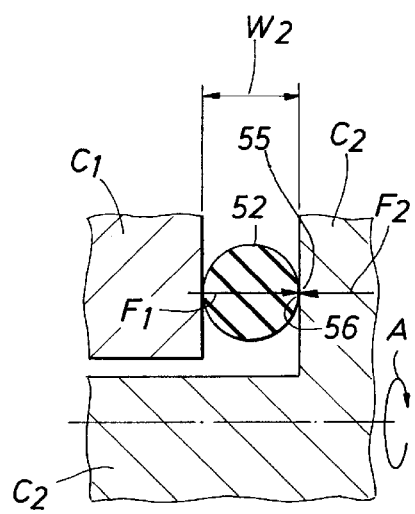
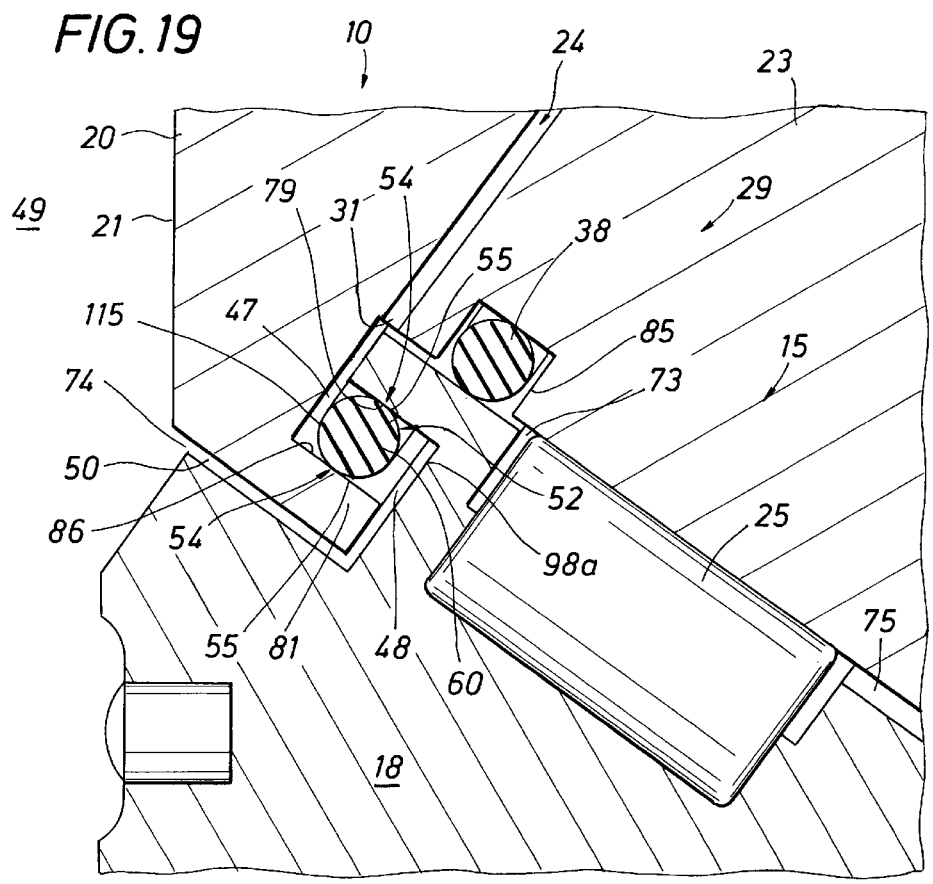

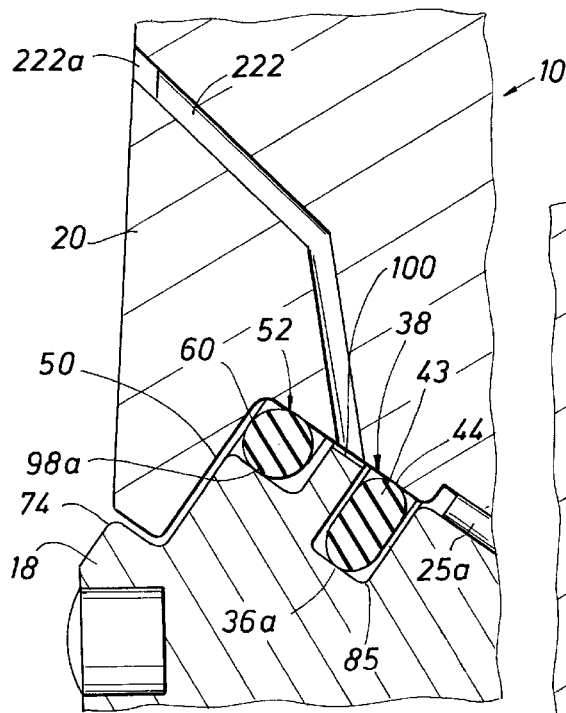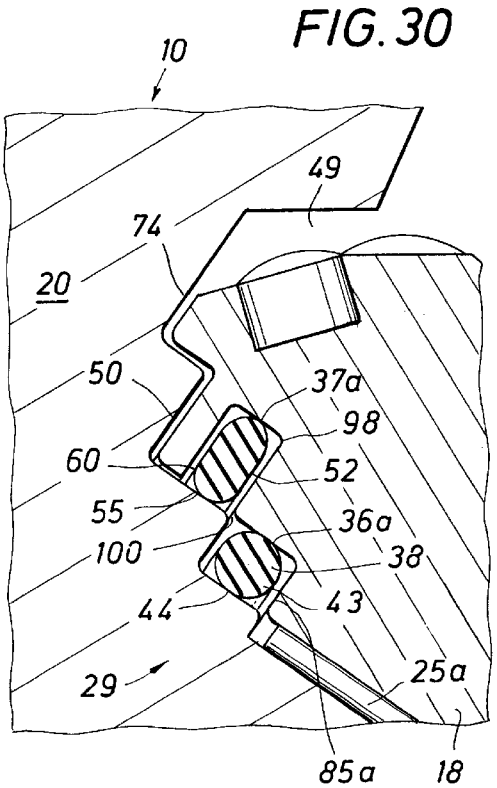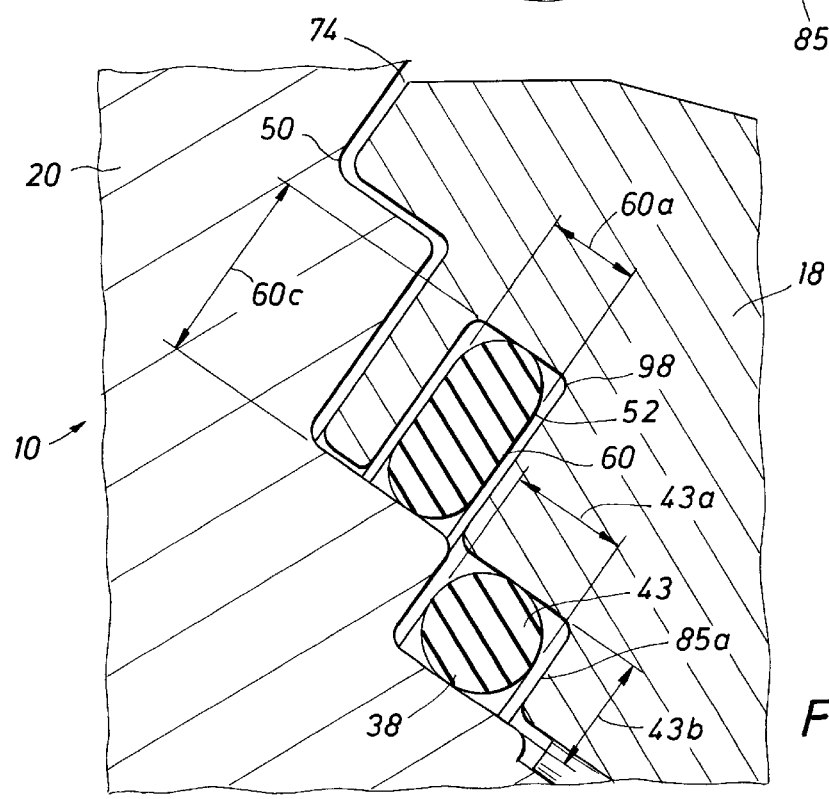

SEALED BEARING DRILL BIT WITH DUAL-SEAL CONFIGURATION AND FLUID-CLEANING CAPABILITY

CROSS REFERENCE TO RELATED APPLICATIONS

This is a continuation-in-part application of U.S. patent application Ser. No. 08/574,793, filed Dec. 19, 1995, and entitled Seal Protection for Sealed Bearing Rotary Cone Rock Bits, which is incorporated herein by reference in its entirety.

STATEMENT REGARDING FEDERALLY SPONSORED RESEARCH OR DEVELOPMENT

Not applicable.

BACKGROUND OF THE INVENTION

1. Field of the Invention

The present invention relates generally to sealed bearing earth boring drill bits, such as rotary cone rock bits that utilize a fluid circulation medium. More particularly, the invention relates to such drill bits that have a dual seal arrangement for protecting internal bearing elements.

2. Background

During earthen drilling operations with the use of sealed bearing rotary cone drill bits, it is necessary to protect the bearing elements of the bit from contamination in order to sustain bit operability. In particular, it is desirable to isolate and protect the bearing elements of the bit, such as bearings, lubricant and bearing surfaces that are located in a cavity or cavities between each corresponding bit leg and cutter cone, from earthen cuttings, mud and other debris in the drilling environment. Introduction into the bearing system of such contaminants leads to deterioration of the bearing lubricant, bearings and bearing surfaces, causing premature bit failure.

It is well known in the art to provide an annular seal around the bearing elements to prevent contamination thereof by particles entering from the exterior of the bit through the annular opening and gap formed between each leg and corresponding cutter cone and extending to the cavity or cavities carrying bearing system elements. Single seal arrangements, however, are known to be susceptible to leakage and premature wear due, for example, to the intrusion and abrasive effect of particles entering through the annular opening. When the single seal fails to provide an absolute seal, the bearing elements become contaminated.

Dual seal arrangements have been proposed having an annular outer seal disposed around a primary inner seal for providing a second layer of protection from particles entering the annular opening. Generally, the outer seals of many prior art dual seal arrangements have proven to provide insufficient protection around the primary seal. When the outer seal fails and allows particles or other contaminants to the primary seal, contamination of the bearing elements can occur as described above. Furthermore, various prior art dual seal arrangements require additional components or internal bit mechanisms that are subject to malfunctioning, increasing the risk of contamination of the bearing system, or that increase the complexity of the bit and its manufacturing process.

U.S. Pat. No. 3,746,405, for example, discloses a sealed bearing rotary cone rock bit with a dual O-ring seal arrangement. The outer O-ring seal is disposed in a groove formed in the cone for engaging the leg backface, and is thus being primarily axially energized. During operation, the use of an outer O-ring seal that is axially energized is highly susceptible to failure, or lift-off, as the cone moves relative to the leg during the normally occurring misalignment, or end-play of the cone, allowing the ingress of particles from the annular opening to the inner seal.

Attempts have been made to prevent particles from entering the annular opening by directing pressurized drilling fluids, such as air, from within the drill bit out through the annular opening. U.S. Pat. No. 4,102,419 discloses a rock bit with an inner metal sealing ring and a set of outer hardened mating surfaces between the leg and cone. Fluid is directed from inside the bit, by the inner metal sealing ring and the outer mating surfaces, and through the annular opening to flush cuttings or other debris away from the inner seal. If the exiting fluid flow decreases or ceases, however, the outer mating surfaces will not effectively prevent the ingress of particles to the inner metal sealing ring due to the relative movement between the cone and leg during cone misalignment, thus exposing the inner metal sealing ring to contamination.

It has also been proposed to include a groove formed in the cone between the inner primary seal and the annular opening for directing fluid from inside the bit through the annular opening to prevent the entry of particles from the borehole. In U.S. Pat. No. 4,453,836, air is supplied into a groove formed between the cone and leg. An outer labyrinth-type seal is disposed in a groove formed in the leg journal segment between the inner seal and the air groove. The outer seal thus surrounds the inner seal, which is located in another groove in the leg journal segment. The disclosed labyrinth-type seal will, however, be susceptible to fluid/particle penetration if the exiting air flow decreases or ceases, leading to contamination of the inner seal.

U.S. Pat. No. 5,513,711 discloses a perforated outer Bellville spring seal disposed in a groove between an inner O-ring seal and the annular opening. Air ejected between the seals passes through the perforations in the outer seal and exits the bit through the annular opening for preventing the ingress of debris from the borehole. Again, should the air pressure decrease or cease, particles will likely pass through the perforations of the outer seal and ingress to the inner seal.

It is thus believed that prior art dual seal arrangements have significant disadvantages, and there remains a need for an effective dual seal arrangement for a sealed bearing rotary cone drill bit. The arrangement must include an annular outer seal capable of substantially protecting the annular inner seal around its circumference from particles that may enter the bit through the annular opening between the cutter cone and leg. The arrangement must also include an inner seal capable of effectively sealing the bearing system and preventing bearing system lubricant contamination. Both seals must be capable of operating under typical bit operating conditions, which include cone misalignment, or end-play, relative to the leg. Especially well received would be a dual seal arrangement capable of having a long expected life-span, occupying minimal space in the limited bit area surrounding the bearing system, and which would not include significant additional internal bit mechanisms or manufacturing requirements.

BRIEF SUMMARY OF THE INVENTION

In accordance with the present invention, there is provided a drill bit for use in an earthen annulus including a bit body having at least one leg, the leg having at least one journal segment. A roller cone is rotatably mounted upon the leg journal segment and forms at least one bearing cavity therebetween. An annular primary seal is disposed between the leg and roller cone and is capable of sealing the bearing cavity. An annular secondary seal is disposed between the leg and roller cone and between the annular primary seal and the earthen annulus. The annular secondary seal is capable of substantially preventing the ingress of debris from the earthen annulus to the annular primary seal.

Both the primary and secondary seals are capable of operating under typical bit operating conditions, including cone misalignment, or end-play, relative to the leg. In various configurations of the present invention, the primary and secondary seals are capable of having a long expected life-span, occupying minimal space in the limited bit area surrounding the bearing system, and do not include significant additional internal bit mechanisms or manufacturing requirements.

Certain configurations include a secondary seal that is radially energized, while others include an axially energized secondary seal. An annular space between the primary and secondary seals in complete fluid isolation and which may be completely filled with incompressible fluid may be included. The primary seal may be positioned along the central axis of the journal segment closer to the bearing cavity than the secondary seal. Further, the axial extent of the primary seal may at least partially overlap the axial extent of the secondary seal, such as by at least 15 percent of the total axial length of the primary seal.

At least one of the primary and secondary seals may have a non-circular cross section, and the seals may have different cross sections. Each seal having a dynamic sealing surface, the primary and secondary seals may have different peak contact pressures at their dynamic sealing surfaces. The dynamic sealing surfaces of the seals may be at different radii from the central axis of the journal segment. Furthermore, the primary and secondary seals may be disposed in various configurations of grooves in the cutter cone and leg and interstices between the cutter cone and leg.

In another configuration, the present invention includes a drill bit for use in an earthen annulus that contains loose particles, the drill bit being connected to a fluid supply source. The drill bit includes a bit body having at least one journal segment and at least one fluid conduit in fluid communication with the fluid supply source, and a roller cone rotatably mounted upon the journal segment and forming at least one bearing cavity therebetween. An annular primary seal is disposed between the roller cone and the bit body and between the bearing cavity and the earthen annulus. An annular gap is disposed between the annular primary seal and the earthen annulus, the annular gap in fluid communication with the fluid conduit and the earthen annulus. An annular secondary seal is disposed between the annular primary seal and the earthen annulus.

Depending upon the configuration of the present invention, the secondary seal may be disposed between the fluid conduit and the annular primary seal. The secondary seal may be primarily radially energized and may be non-perforated. An annular space may be disposed between the roller cone and bit body and between the annular gap and the annular primary seal, the annular interstice in fluid communication with the fluid conduit and the annular gap. The annular secondary seal may be disposed at least partially within the annular interstice. Furthermore, the annular interstice may include at least one port in fluid communication with the conduit, the port capable of allowing the flow of fluid into the annular interstice from the conduit. The annular secondary seal may be disposed between the port and the annular gap, and may include a one-way valve capable of permitting the flow of fluid from the annular interstice into the annular gap and substantially inhibiting the ingress of particles from the annular gap to the annular primary seal.

Accordingly, the present invention comprises a combination of features and advantages which enable it to substantially advance the technology associated with sealed bearing drill bits. While the appended claims are not limited to the characteristics and advantages of the present invention described herein as well as additional features and benefits, various exemplary features of the invention will be readily apparent to those skilled in the art upon reading the following detailed description and referring to the accompanying drawings. dr

BRIEF DESCRIPTION OF THE DRAWINGS

For a detailed description of the preferred embodiments of the invention, reference will now be made to the accompanying drawings wherein:

FIG. 4 is a partial cross-sectional view of one leg of a rotary cone drill bit having another embodiment of the present invention employing a radially energized secondary lip seal having a sealing lip mounted on an L-shaped metal backing ring disposed in an interstice formed between the cutter cone and leg.

FIG. 5 is a partial cross-sectional view of another embodiment of the present invention employing an axially energized, secondary lip seal.

FIG. 12 is a partial cross-sectional view of another embodiment of the present invention employing a primary O-ring seal disposed in an interstice and a secondary combination seal disposed in a groove in the cutter cone.

FIG. 12a is a partial cross-sectional view of another embodiment of the present invention employing a primary O-ring seal disposed in an interstice and a secondary seal disposed in a groove in the leg journal segment.

FIG. 13 is a partial cross-sectional view of another embodiment of the present invention employing a primary and a secondary seal disposed in the same groove in the cutter cone, both seals having non-circular cross-sections.

FIG. 17 is a partial cross-sectional view of a primarily radially energized annular seal.

FIG. 18 is a partial cross-sectional view of a primarily axially energized annular seal.

FIG. 19 is a partial cross-sectional view of still another embodiment of the present invention employing a radially energized O-ring secondary seal.

FIG. 29 is a partial cross-sectional view of another embodiment of the present invention employing a primary elongated O-ring seal disposed in a groove in the cutter cone and a secondary O-ring seal disposed in an interstice.

FIG. 30 is a partial cross-sectional view of another embodiment of the present invention employing a primary seal disposed in an interstice and a secondary seal disposed in a groove in the cutter cone.

FIG. 30a is an exploded partial cross-sectional view of an embodiment of the present invention employing a primary O-ring seal in an interstice and a secondary elongated O-ring seal disposed in a groove in the cutter cone.

DETAILED DESCRIPTION OF THE INVENTION

Figure 1:
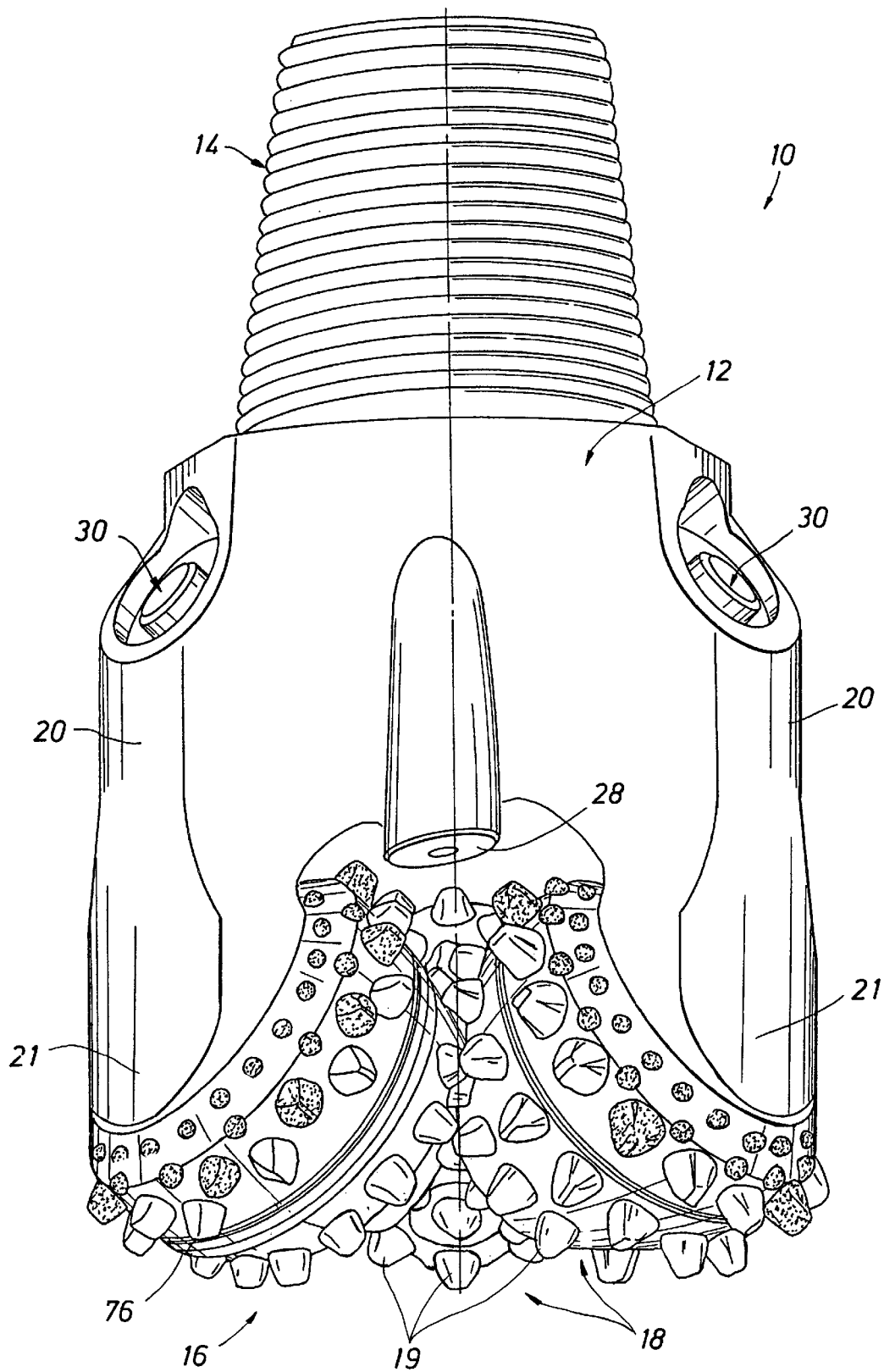
FIG. 1 is a perspective view of a sealed bearing rotary cone drill bit made in accordance with the present invention.

Presently preferred embodiments of the invention are shown in the above-identified figures and described in detail below. In illustrating and describing the preferred embodiments, like or identical reference numerals are used to identify common or similar elements. The figures are not necessarily to scale and certain features and certain views of the figures may be shown exaggerated in scale or in schematic form in the interest of clarity and conciseness.

Figures 2, 2A:
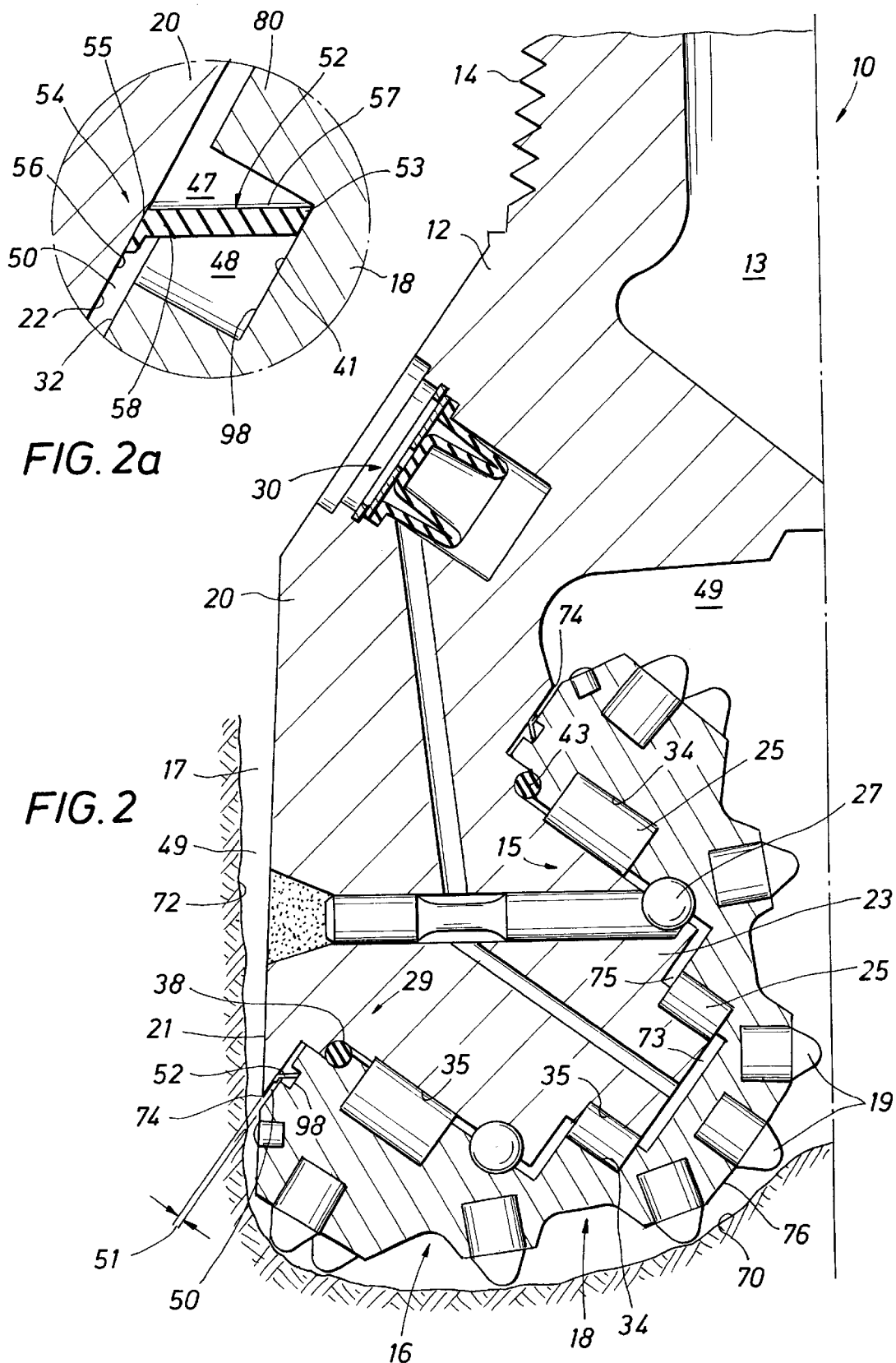
FIG. 2 is a cross-sectional view of one leg of the rotary cone drill bit of FIG. 1 having a dual seal arrangement in accordance with the present invention.
FIG. 2a is an exploded partial cross-sectional view of the secondary lip seal of FIG. 2.

Referring initially to FIGS. 1 and 2, a sealed-bearing earth boring rotary cone rock bit 10 is shown in an earthen annulus, or borehole 17. It should be understood that the present invention is not limited to rotary cone rock bits 10, but may similarly be used in other types of sealed bearing earth boring drill bits. The bit 10 includes a bit body 12, a threaded pin end 14 and a cutting end 16. Legs 20 extend from bit body 12 toward the cutting end 16 of the bit 10. At the cutting end 16, each leg 20 carries a cutter cone 18. Typically, rotary cone drill bits have three legs 20 and cones 18, although the present invention may be used in bits 10 with any number of leg 20/cone 18 combinations.

Figure 3:
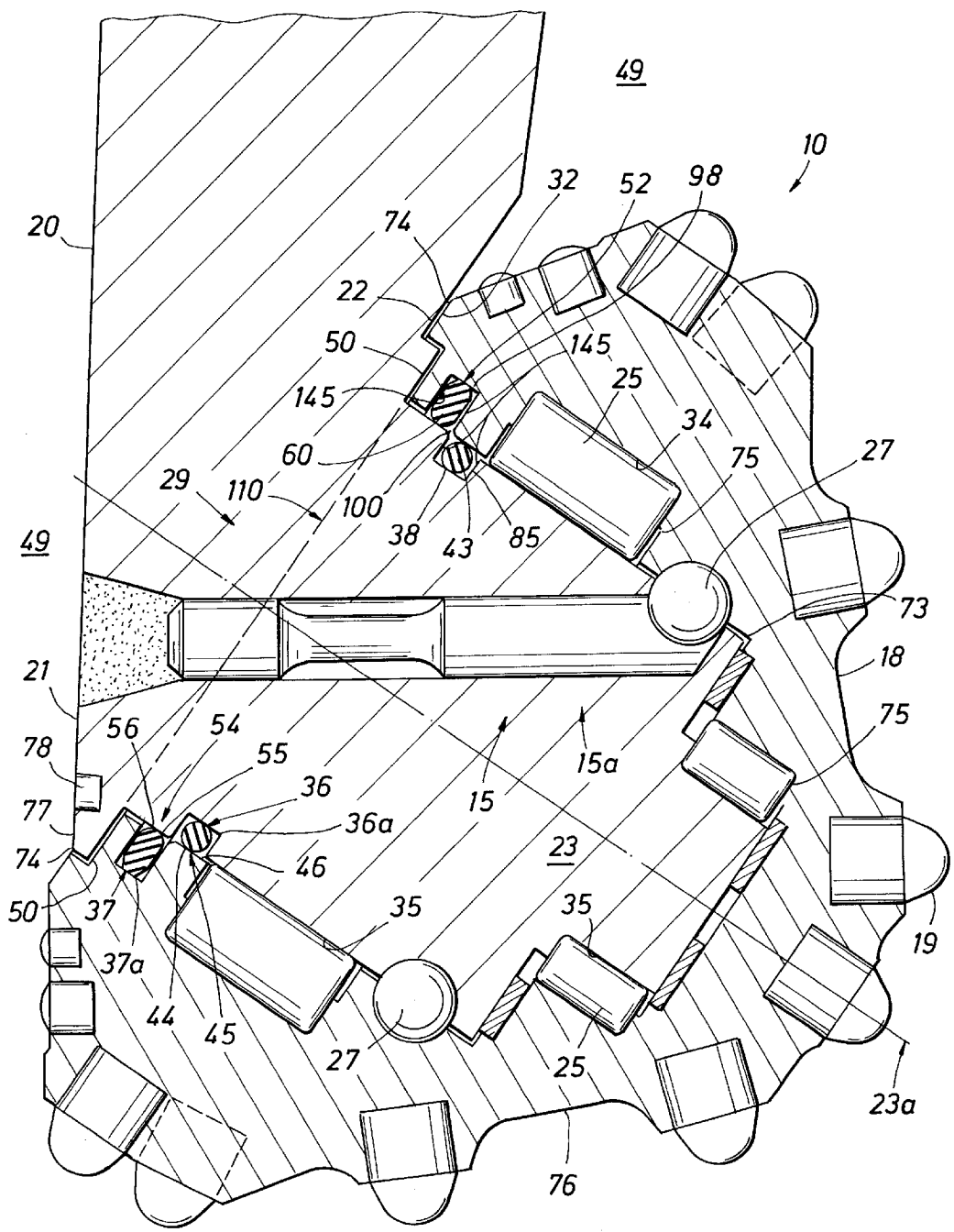
FIG. 3 is a is a partial cross-sectional view of one leg of a rotary cone drill bit of the present invention employing a primary seal disposed in an annular groove formed in the leg journal and a secondary seal disposed in an annular groove formed in the cone.

It should be understood that the following description of the preferred embodiments of the present invention is made, in part, with reference to a single leg 20, cone 18 and corresponding features, but applies equally to each leg 20 and cone 18 of the bit 10. Referring to FIGS. 2 and 3, the cutter cone 18 is rotatably mounted upon a journal segment 23 of the leg 20, the journal segment 23 extending into the bore 73 of the cone 18. The journal segment 23 has a central axis 23a (FIG. 3). The cone 18 is disposed on the leg 20 adjacent to a shirttail portion 21 of the leg 20. As shown in FIG. 3, the adjacent cone backface surface 32 and leg backface surface 22 form a gap 50 that extends between the leg 20 and cone 18 to the exterior 49 of the bit 10. The gap 50 exits the bit 10 to the bit exterior 49, or borehole 17 (FIG. 2), at an annular opening 74. Preferably, the bit is configured with the gap 50 having a generally uniform width 51 (FIG. 2), although a uniform width 51 is not necessary for operation of the invention.

Still referring to FIGS. 2 and 3, a conventional drill bit bearing system 15, such as the roller bearing system disclosed in U.S. Pat. No. 4,793,719 to Crockett et al., which is incorporated herein by reference in its entirety, permits the rotation of the cone 18 about the journal segment 23 during drilling operations. The bearing system 15 includes various bearing elements. For example, the roller bearing system 15a of FIG. 3 includes cone bearing surfaces 34, journal bearing surfaces 35, roller bearings 25 and locking balls 27, disposed in one or more bearing cavities 75 formed between the cone 18 and journal 23, or in the bore 73 of the cone 18. A lubricant, such as grease (not shown), is provided to the bearing system 15 via a conventional lubricant reservoir system 30 (FIG. 2). It should be understood that a friction bearing system 15b (FIG. 4), operating as known in the art and having components, such as friction bearings 25a, similarly contained in the bearing cavities 75, may be used with the present invention instead of a roller bearing system 15a. The term "bearing" as used generally herein includes roller bearings and friction bearings. It is noteworthy that conventional friction bearing systems 15b, as compared with roller bearing systems 15a, generally possess better load bearing capabilities and allow more room, or space, within the bit 10 for the placement of a bearing system seal arrangement 29 as will be described below.

Still referring to FIG. 2, a plenum 13 is formed in the bit body 12 in communication with the pin end 14 of the bit 10 allowing the supply of circulation fluid to one or more nozzles 28 (FIG. 1), as is known in the art. A circulation fluid, such as air, water, drilling mud or other fluids as is or becomes known in the art, is provided into the bit 10 from a fluid supply source (not shown) and through a supply conduit, such as a drill pipe (not shown), that is attached to the pin end 14 of the bit 10, as also known in the art. The nozzles 28 (FIG. 1) operate to direct pressurized fluid against the bottom 70 of the borehole 17 to lift earthen cuttings and other debris up through the borehole 17 to the surface (not shown). The nozzles 28 also direct the circulation fluid over the exterior 76 of the cones 18 and cutters 19 to free debris accumulating thereabout.

The existence of earthen cuttings, mud and other debris in the borehole or annulus 17 and throughout the drilling environment makes it imperative that the bearing system 15 be isolated therefrom, or sealed. Introduction into the bearing system 15 of such contaminants leads to deterioration of the lubricant and bearing system elements, such as the roller bearings 25 and bearing surfaces 34, 35 (FIG. 3) which, in turn, leads to premature bit failure. A bearing system seal arrangement 29 in accordance with the present invention protects the bearing system 15, thus assisting in sustaining operability of the bit 10. The seal arrangement 29 of the present invention, as shown, for example, in FIGS. 3 and 4, includes an annular primary seal 38 and an annular secondary seal 52.

Referring to FIGS. 3 and 4, the seals 38, 52 must be able to function between a cone 18 and a leg 20 experiencing misalignment and relative movement during drilling operations due to flexing of the leg journal segment 23 and end-play, or cocking, of the cone 18 as a result of the uneven forces placed upon the cone exterior 76. Another consideration in configuring the seal arrangement 29 is the space within the bit 10 available for, or occupied by, the seal arrangement 29. The less space in the bit 10 that is occupied by the seal arrangement 29, the more space is available for other elements of the bit 10, such as the bearing system 15, particularly the bearings, and the greater the resulting capacity of the bearing system 15 and operability of the bit 10. Yet another concern is to minimize the time, effort and machinery for manufacturing and assembling the bit 10, such as for machining the leg 20, journal segment 23 and cone 18. The present invention provides various aspects of seal arrangement 29 that independently, or in combination, assist in protecting the bearing system 15 in view of the above and other considerations.

Still referring to FIGS. 3 and 4, the annular primary seal 38 is preferably disposed between the bearing cavities 75 and the opening 74 and between the cone 18 and journal segment 23, generally capable of providing an absolute seal around the bearing cavities 75. The term "absolute" seal as used herein means a fluid tight seal, or allowing no fluid passage, by a seal having normal wear and tear and operating under typical pressure conditions. The annular secondary seal 52 is disposed between the primary seal 38 and the opening 74, and is generally capable of substantially preventing the ingress of debris and particles from the exterior 49 of the bit 10 and gap 50 to the primary seal 38. The secondary seal 52 may be placed between the cone 18 and either the leg 20 (FIG. 5) or the journal segment 23 (FIG. 3).

Referring to FIG. 3, as used herein, the term "components" of the bit 10 refers to the leg 20, leg journal segment 23 and cone 18. Sealing by seals 38, 52 is effected by compression, or energization, of the seal between an opposed pair of surfaces ("energizing surfaces"), each energizing surface being on a different bit component. The remaining bit component surfaces surrounding the seal are referred to herein as "non-energizing surfaces." Because the cone 18 rotates relative to the leg 20 and leg journal segment 23 during drilling operations, each seal 38, 52 is capable of providing a seal between bit components that move relative to one another.

Generally, each seal 38 and 52 is situated in the bit 10 such that it is capable of providing a static seal against an energizing surface of one component at a "static seal interface," the seal 38, 52 generally having little or no relative movement with that component. The static seal interfaces of seals 38, 52 are identified with the numerals 36 and 37, respectively. A dynamic seal is generally formed at a "dynamic sliding seal interface" between the seal 38, 52 and the other energizing surface (of a different bit component) with which the seal 38, 52 primarily engages. The dynamic sliding seal interfaces of seals 38, 52 are identified with the numerals 45, 54, respectively. The surface of each seal 38, 52 forming the dynamic sliding seal interface is referred to as the "dynamic sealing surface" 44, 55 of the seal 38, 52, respectively, and the energizing surface of the bit component forming the dynamic sliding seal interface is referred to as the "contact surface" 46, 56, respectively. Though not essential, the contact surfaces may be formed with special hard metal welded inlays, such as nickel carbide weld rod, or have a separate mating ring formed of a hard material, such as tungsten carbide, to provide a better wear resistant surface.

Referring to FIGS. 4 and 5, the primary seal 38 is preferably an O-ring seal 43 having a dynamic sealing surface 44 constructed at least partially of an elastomeric material (not shown). An example of an O-ring seal useful with the present invention is described in U.S. Pat. No. 5,402,858 to Quantz et al., which is hereby incorporated herein by reference in its entirely. Other types of O-ring seals as are or become known in the art to be compatible for use as sealed bearing drill bit seals may be used. It should be noted that the term "O-ring" as generally used herein with respect to both the annular primary seal 38 and the annular secondary seal 52 is not limited to seals having only circular cross-sections, such as seal 43 of FIG. 5, but is intended to include seals having non-circular cross-sections, such as seal 43 of FIG. 4 and seal 43 of FIG. 8. Other types of annular sealing members (other than O-ring seals as defined above) that are, or become known to be, compatible for use as primary seal 38 in accordance with the present invention may likewise be used. For example, the primary seal 38 may be a PolyPak™, Quad-Ring®, U-Cup™, Spring Loaded U-Cup™, Lip Seal, Spring Loaded PolyPak™ seal or a combination seal, such as the various combination seals 61 described herein with respect to the secondary seal 52. Furthermore, the seal 38 may be constructed of any suitable material or materials as is or becomes known in the art.

Figure 6:
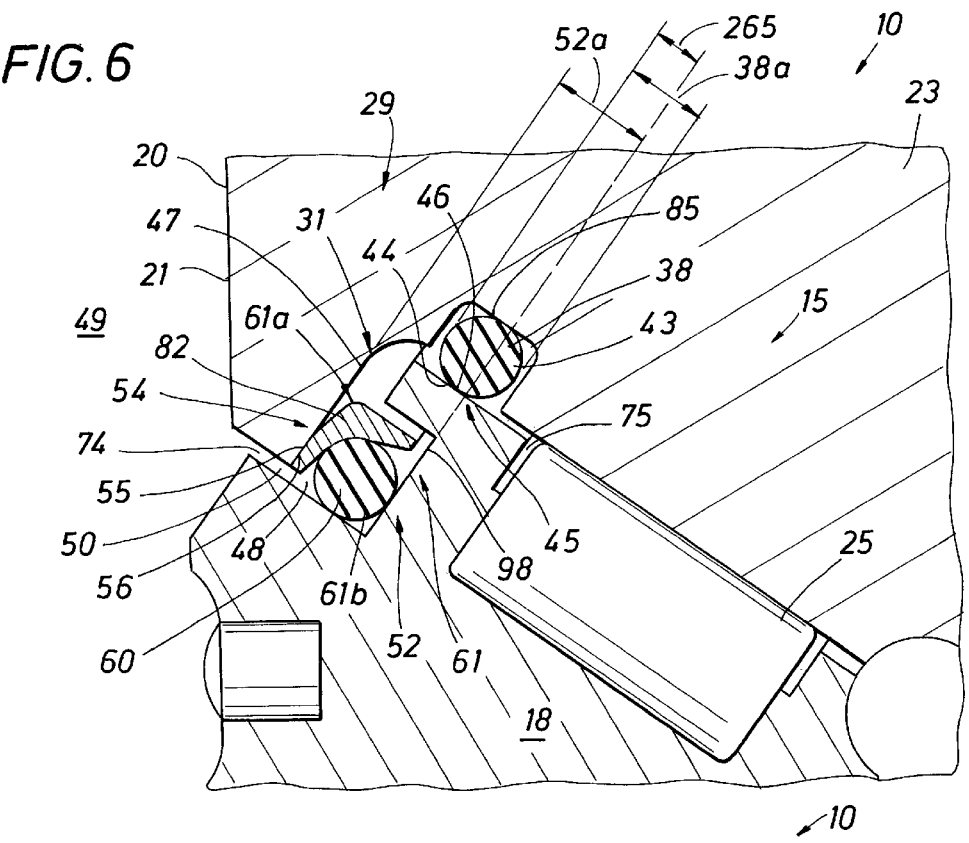
FIG. 6 is a partial cross-sectional view of yet another embodiment of the present invention employing a combination secondary seal having a rigid, non-elastomeric ring and an annular energizing member.
Figure 21:
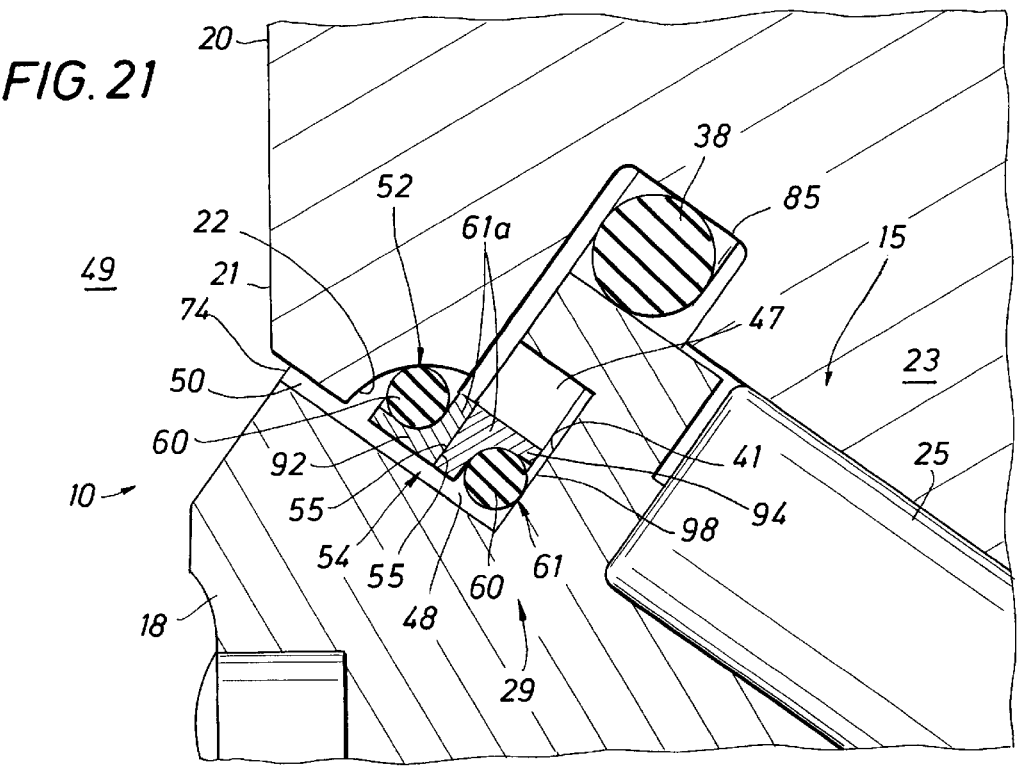
FIG. 21 is a partial cross-sectional view of another embodiment of the present invention employing a combination secondary seal having a pair of annular rings and a pair of energizing O-ring members.

Referring to FIGS. 4 and 6, an annular outer, or secondary seal 52 is shown disposed in the bit 10 between the primary seal 38 and the opening 74. It should be noted that the term "secondary seal" as used generally herein includes single element seals, such as O-ring seals 60 (FIGS. 3, 9) and lip seals 57 (FIG. 2a), seals having multiple elements connected together by bonding or other suitable connection means, such as a lip seal 57 (FIGS. 4, 5) or bellville spring seal 63 (FIG. 23), and seals having multiple unconnected elements, such as combination seals 61 (FIGS. 6, 21). Other types of annular sealing members that are, or become known to be, compatible for use as a secondary seal 52 in accordance with the present invention may likewise be used. Further, the seal 52 may be constructed of any suitable material or materials as is or becomes known in the art.

Figure 7:
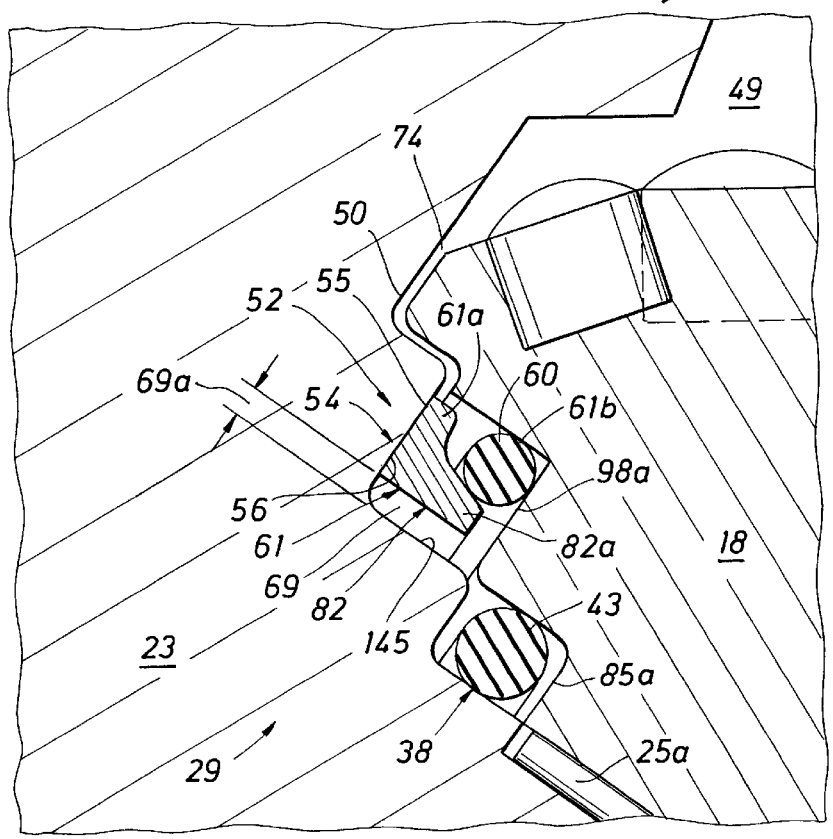
FIG. 7 is a partial cross-sectional view of another embodiment of the present invention employing a primary seal disposed in an interstice, and a combination secondary seal having a rigid, non-elastomeric ring and an annular energizing member disposed in an interstice.

In accordance with the present invention, one or both of the seals 38, 52 may be disposed in grooves formed in bit components, or in interstices formed between bit components, such as by bonding or interference fit. A "groove," such as grooves 85, 98 of FIG. 3, includes a cutout portion in a single bit component. In a groove, at least a portion of each of a pair of opposed non-energizing surfaces are surfaces of a single component. When a seal is disposed in a groove, the seal is at least partially confined in non-energizing directions by primarily non-energizing surfaces of a single bit component. An "interstice," such as interstices 85a, 98a of FIG. 7, is an annular space formed between bit components, wherein no portion of each of any pair of opposed non-energizing surfaces are surfaces of a single bit component. Further, each of a pair of opposed non-energizing surfaces of an interstice is at least partially on a different bit component.

Referring to FIGS. 7 and 12, the placement of one or both seals 38, 52, in interstices 85a, 98a generally occupies less space within the bit 10 as compared to the placement of one or both seals 38, 52 in grooves. Seal arrangements 29 with one or both seal 38, 52 in interstices can be very compact, allowing the placement of longer bearings, such as bearings 25a, in the bearing cavities 75, increasing the bit's load capacity. Further, the leg 20 and cone 18 of the bit 10 will generally be stronger than when grooves are formed therein, the formation of grooves requiring removal of mass of a bit component. This reduces the stress concentration factor in the leg 20 resulting from inclusion of a groove formed in the leg 20 and reduces the possibility of breakage of the leg 20 at the groove, thus enhancing bit longevity. The use of interstices also saves time and effort in construction of the bit components, and reduces the complexity of the manufacturing process by eliminating the difficulty in machining grooves into the leg 20, leg journal 23 and cone 18.

Now referring to FIG. 3, the placement of one or both seals 38, 52 in grooves 85, 98, respectively, provides benefits in various seal arrangement 29 configurations. For example, the opposing non-energizing surfaces 145 of groove 98 provide stability to primarily elastomeric seals, such as elongated secondary O-ring seal 60. As pressure is applied to the seal 60 by the energizing surfaces 56, 37a forming the groove 98, the seal 60 has a natural tendency to deform or bow therebetween. In addition, in a high potential down hole pressure differential environment, the seals 38, 52 may be subject to being drawn, or extruded, into the space 100 between the seals 38, 52. Such deformation and extrusion of a seal can reduce the sealing effectiveness of the seal and lead to seal failure. The opposing non-energizing surfaces 145 of the groove 98 will provide support for the sides of the seal 60, assisting in preventing such deformation. Furthermore, because opposing non-energizing surfaces 145 of groove 98 are both at least partially formed in the same bit component, and because a seal 52 in the groove generally does not move relative to the bit component within which the groove 98 is formed, the seal 52 is generally stationary relative to such opposing non-energizing surfaces 145 and any contact that may occur between the seal 52 and the non-energizing surfaces 145 will not subject the seal 52 to shear stress and wear that would occur if there was relative movement between the seal 52 and a surface 145, which would damage the seal 52. The same benefit exists when the primary seal 38 is disposed in a groove 85.

The seals 38, 52 may be disposed in a variety of configurations of grooves and interstices. For example, the primary seal 38 may be disposed in an annular groove 85 formed in the cone 18 (FIGS. 4, 5). A dynamic sliding seal interface 45 is created between a dynamic sealing surface 44 of the primary seal 38 and a contact surface 46 of the journal segment 23 as the seal 38 generally rotates with the cone 18 relative to the leg 20. The primary seal 38 may instead be disposed in a groove 85 formed in the leg journal segment 23 (FIG. 6). In such configuration, a dynamic sliding seal interface 45 is formed between contact surface 46 of the cone 18 and dynamic sealing surface 44 of the seal 38 as the cone 18 generally rotates relative to the leg 20 during operations.

Figure 10:
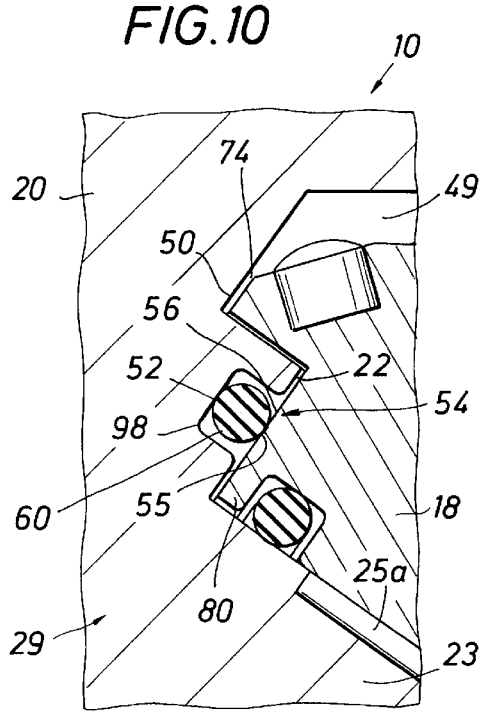
FIG. 10 is a partial cross-sectional view of another embodiment of the present invention employing a primary O-ring seal disposed in a groove in the cutter cone and a secondary O-ring seal disposed in a groove formed in the leg backface surface.
Figure 9:
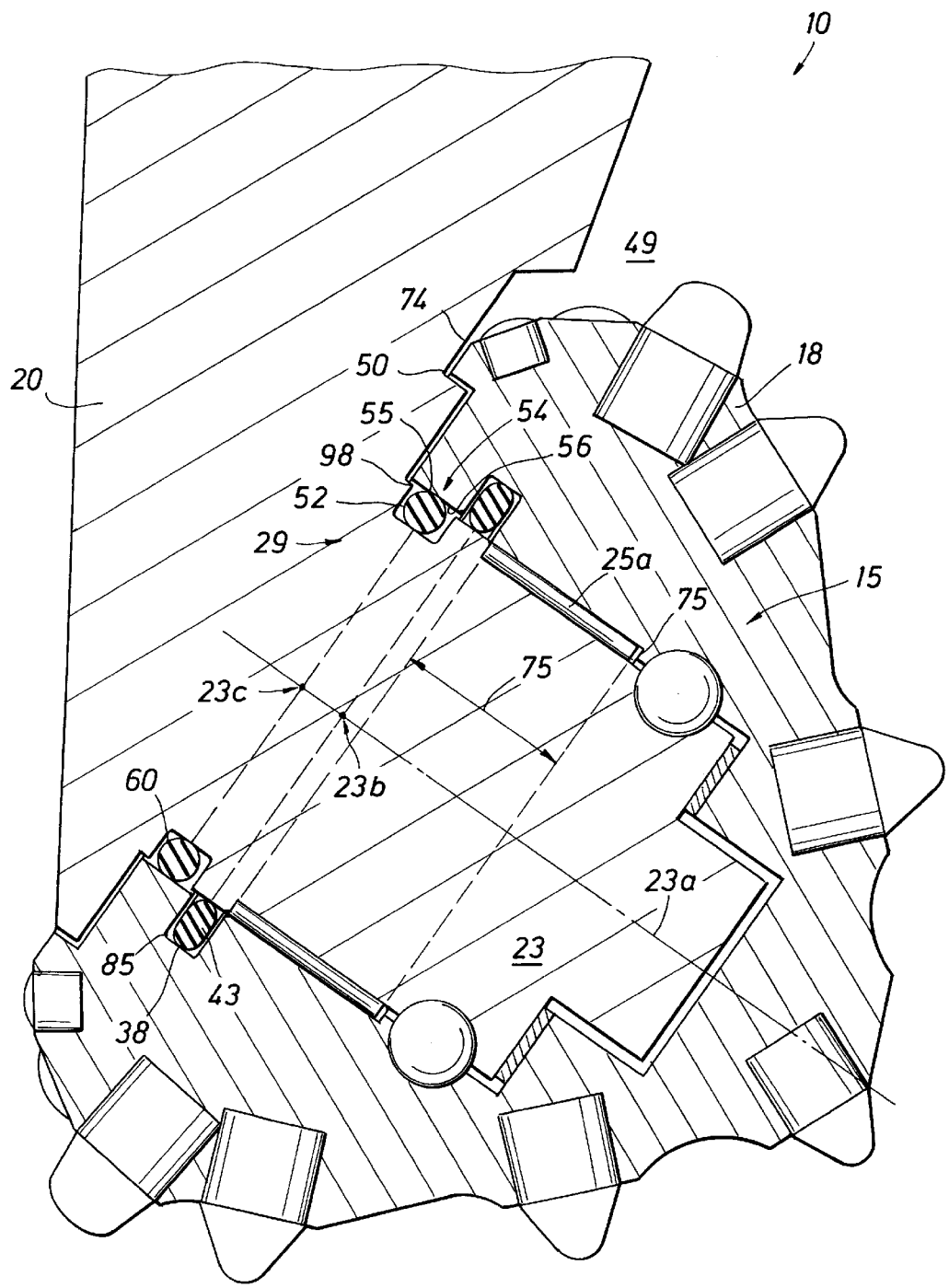
FIG. 9 is a partial cross-sectional view of yet another embodiment of the present invention employing a primary elongated O-ring seal disposed in a groove in the cutter cone and a radially energized secondary O-ring seal disposed in a groove in the leg journal segment.

The secondary seal 52 may be disposed in a groove 98 formed in the cone 18 (FIGS. 2a, 3), the seal 52 generally rotating with the cone 18 relative to the leg 20. A dynamic sliding seal interface 54 is created between the dynamic sealing surface 55 of the seal 52 and the contact surface 56 of the leg 20 (FIG. 2a), or the contact surface 56 of the leg journal segment 23 (FIG. 3). In another configuration, the secondary seal 52 is disposed in a groove 98 in the journal segment 23, as shown in FIG. 9. In yet another configuration, the secondary seal 52 is disposed in a groove 98 in the leg backface 22 (FIG. 10). In each of these configurations, a dynamic sliding seal interface 54 is created between dynamic sealing surface 55 of the seal 52 and cone contact surface 56, the seal 52 being generally stationary relative to the leg 20 as the cone 18 moves relative thereto.

In various configurations, both seals 38, 52 are disposed in grooves. In FIG. 3, for example, the primary seal 38 is disposed in a groove 85 in the journal segment 23, while the secondary seal 52 is disposed in a groove 98 in the cone 18. In this configuration, the primary seal groove 85 is located in the journal segment 23 spaced from the intersection 110 of the leg 20 and leg journal segment 23, minimizing weakening of the leg 20 at the intersection 110 that would result from formation of a groove proximate to the intersection 110.

In FIG. 9, the primary seal 38 is disposed in a groove 85 in the cone 18 and the secondary seal 52 is disposed in a groove 98 in the journal segment 23. In other configurations as shown, for example, in FIGS. 5 and 11, both the annular primary and secondary seals 38, 52 are disposed in grooves 85, 98, respectively, formed in the cone 18, providing the advantage of having no grooves in the leg 20 (or journal segment 23), minimizing weakening of the leg 20 resulting from formation of one or more grooves in the leg 20.

Figure 8:
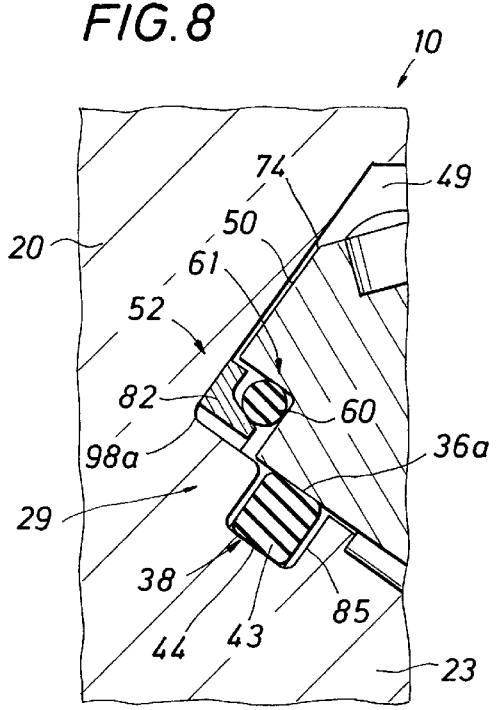
FIG. 8 is a partial cross-sectional view of another embodiment of the present invention employing a primary annular O-ring seal having a non-circular cross section and disposed in a groove in the leg journal segment.

The seals 38, 52 may likewise both be disposed in interstices, or one seal in an interstice and the other seal in a groove. In FIG. 7, for example, the primary seal 38 is disposed in interstice 85a and the secondary seal 52 is disposed in interstice 98a. The secondary seal 52 may be disposed in an interstice 98a, while the primary seal 38 is disposed in a groove 85 in the cone 18 (FIG. 4) or a groove 85 in the journal segment 23 (FIG. 8). Instead, the primary seal 38 may be disposed in an interstice 85a, while the secondary seal 52 is disposed in a groove 98 in the cone 18 (FIG. 12) or journal segment 23 (FIG. 12a).

Figure 14:
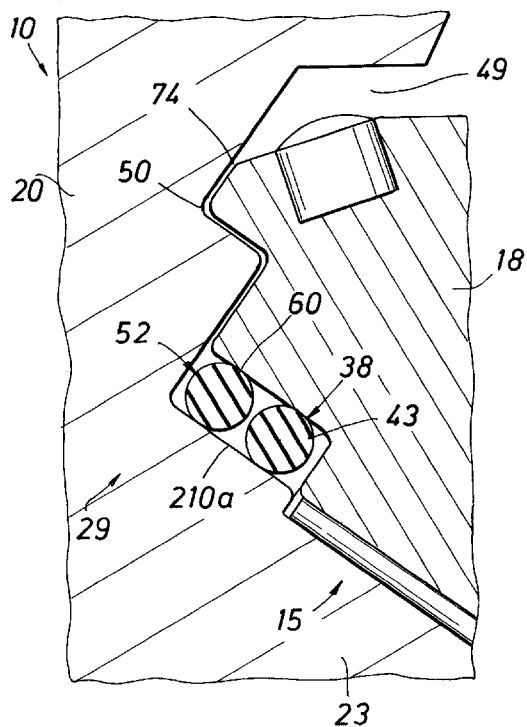
FIG. 14 is a partial cross-sectional view of another embodiment of the present invention employing a primary and a secondary seal disposed in the same interstice, both seals having circular cross-sections.
Figure 15:
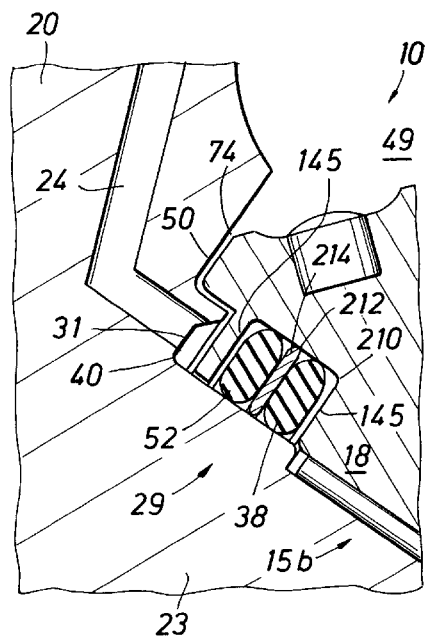
FIG. 15 is a partial cross-sectional view of another embodiment of the present invention employing a primary and a secondary seal disposed in the same groove in the cutter cone, having a spacer between the seals, and including a fluid conduit in fluid communication with an annular groove formed in the leg between the secondary seal and the earthen annulus.

Both seals 38, 52 may instead be located in a single groove 210 in the cone 18, such as shown in FIG. 13, or in a single interstice 210a (FIG. 14). In such configurations, an annular spacer 212, such as ring 214 shown in FIG. 15, may be disposed in the groove 210 between the seals 38, 52, maintaining the desired orientation of the seals 38, 52 and providing support to the seals 38, 52, similarly as described above with respect to the non-energizing surfaces 145 of grooves 98, 85 in FIG. 3. The spacer 212 may be constructed of metal, coated metal, such as metal coated with elastomeric material or Teflon, ceramic or other hard material, polymeric materials, elastomers, or a combination thereof. Alternately, or additionally, a pair of spacers (not shown) may be disposed in the groove 210 or interstice 210a on opposing sides of the seals 38, 52.

Figure 16:
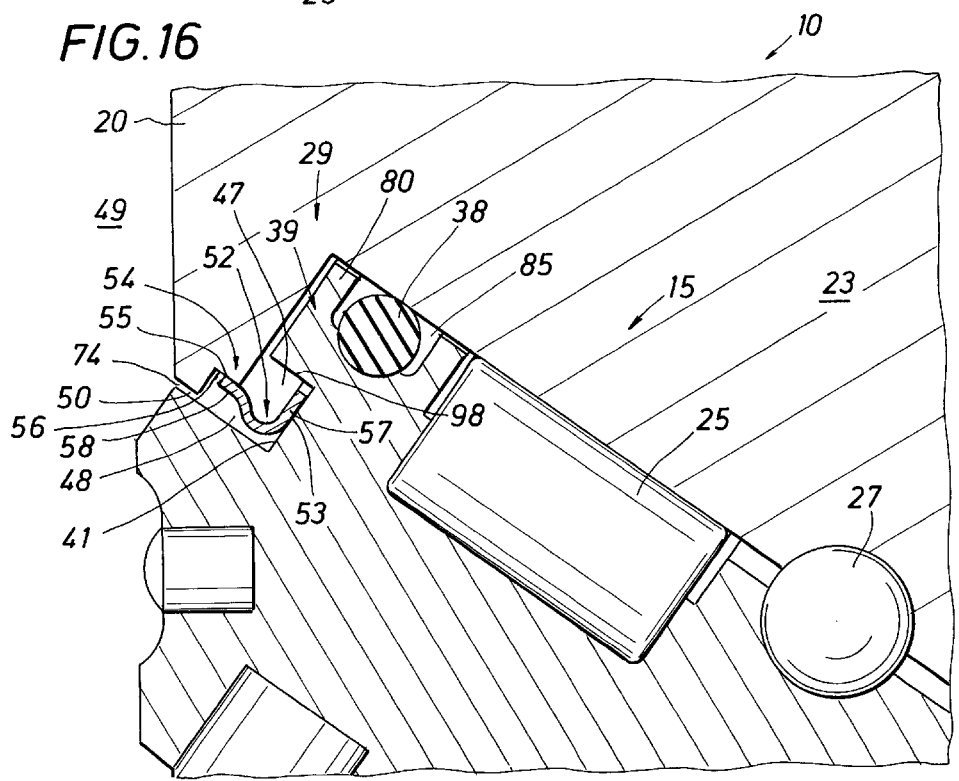
FIG. 16 is a partial cross-sectional view of another embodiment of the present invention employing a radially energized, secondary lip seal.

In another aspect of the present invention, it has been discovered that the sealing effectiveness and longevity of the secondary seal 52 is effected by the orientation of the seal 52 as it is compressed between bit components. In accordance with the invention, the bit 10 may be configured such that the majority of the forces placed on the secondary seal 52 are either primarily axial, such as shown in FIGS. 5 and 7, or primarily radial, such as shown in FIGS. 4 and 16. As used herein, "axial" means generally parallel to, or in a plane not intersecting with, the central axis 23a of the journal segment 23 (FIG. 3), while "radial" means in a plane generally perpendicular to the central axis 23a of the journal segment 23.

For explanatory purposes, a secondary seal 52 having primarily radial forces acting on the seal 52 is shown in FIG. 17 disposed between components $C_1$ and $C_2$. Component $C_2$ has contact surface 56 that engages the dynamic sealing surface 55 of the seal 52, and moves relative to component $C_1$, similar to the relationship of cone 18 ($C_2$) and journal 23 ($C_1$) of FIG. 29. Opposing forces $F_1$, and $F_2$ from components $C_1$ and $C_2$ deflect the seal 52 across the width $W_1$ of the seal 52. As used herein, the term "deflection" means a change in the cross-section of a seal from its original uncompressed cross-sectional shape in a particular direction (axial, radial, other) as compared to the cross-section of the seal when installed in the bit and compressed. The forces placed upon the seal 52 are primarily radial because the opposing forces $F_1$ and $F_2$ are substantially perpendicular to the axis of rotation A of the moving component $C_2$. In FIG. 18, Component $C_2$ moves relative to component $C_1$ similar to the relationship of cone 18 ($C_2$) and leg 20 ($C_1$) of FIG. 10. The dynamic sealing surface 55 of the seal 52 engages contact surface 56 of component $C_2$. Opposing forces $F_1$ and $F_2$ from components $C_1$ and $C_2$ deflect the seal 52 across the width $W_2$ of the seal 52. Primarily axial forces are placed upon the seal 52 because the forces $F_1$ and $F_2$ are substantially parallel to the axis of rotation A of the moving component $C_2$.

The terms "radially energized" and "primarily radially energized" as used herein means that the major component, or majority, of the deflecting forces on a seal are in the radial direction, while "axially energized" and "primarily axially energized" means that that major component of the deflecting forces on a seal are in the axial direction. It should be understood, however, that the primary and secondary seals 38, 52 need not be primarily axially or radially energized, but may be partially energized axially and radially, or energized in another manner. Generally, a primarily radially energized seal 52, such as shown in FIGS. 3 and 4, experiences less variation in total deflection during operation and thus a more uniform contact pressure profile across the seal's dynamic sealing surface, as compared to an axially energized seal 52 (FIG. 5) because the cone 18 typically experiences less movement, cone cocking or misalignment relative to the leg 20 in the radial direction. "Contact pressure" as used herein is the amount of pressure between the seal's dynamic sealing surface and the contact surface of the bit component engaged by the dynamic sealing surface resulting from placement of forces on the seal during its deflection. The contact pressure "profile" as used herein means the contact pressure on the seal at each location among numerous locations on the seal's dynamic sealing surface, while the "peak" contact pressure is the highest single value of contact pressure anywhere on the dynamic sealing surface of the seal. A more uniform contact pressure profile may result in more optimized and predictable seal operating conditions, reduced wear to the seal 52 and the contact surface 56, and decreased frictional heat produced thereby. Further, the dynamic sealing surface 55 of a radially energized seal 52 is generally capable of experiencing less lift-off caused by the misalignment, or relative movement, of the cone 18 and leg 20.

Figure 20:
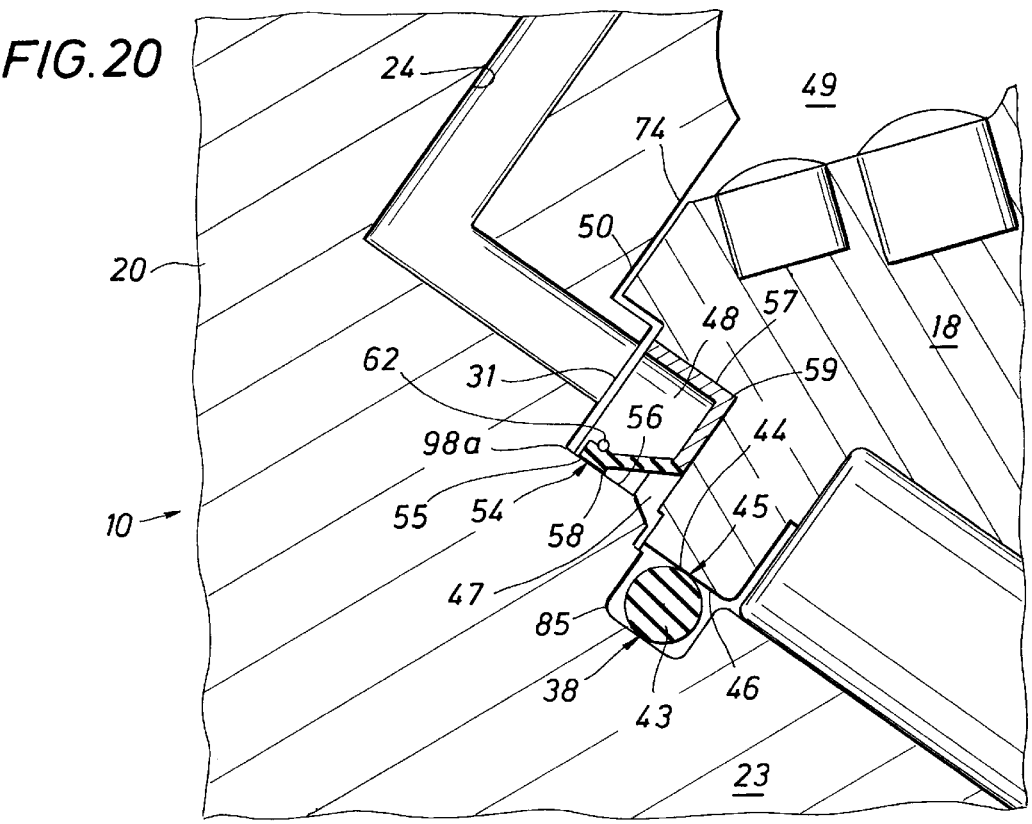
FIG. 20 is a partial cross-sectional view of one leg of a rotary cone drill bit having yet another embodiment of the present invention employing a primary seal disposed in a groove formed in the leg journal segment and a secondary lip seal disposed in an interstice between the primary seal and a fluid conduit, the secondary seal having a biasing member disposed around the seal lip.

In accordance with the present invention, primarily radially energized secondary seals 52 may be positioned between the cone 18 and leg 20, such as shown, for example, in FIGS. 16 and 19, or between the cone 18 and leg journal segment 23 (FIGS. 3, 4). Any suitable type or configuration of secondary seal 52 may be used as a radially energized seal 52. In FIG. 16, for example, the base portion 53 of a lip seal 57 is mounted to the cone surface 41. The elastomeric dynamic sealing surface 55 of the resilient lip portion 58 of the seal 57 creates a dynamic sliding seal interface 54 against the contact surface 56 of leg 20, the seal 57 thus being primarily radially energized. In FIG. 4, the primarily elastomeric resilient lip portion 58 of lip seal 57 is mounted, such as by bonding, onto an L-shaped base, or metal backing ring 59. The backing ring 59, which adds stiffness to the lip 58, is affixed to cone surfaces 41, 42. The dynamic sealing surface 55 of the seal lip 58 engages the journal contact surface 56 to create dynamic sliding seal interface 54, causing the seal 52 to be primarily radially energized. FIG. 20 shows a radially energized secondary lip seal 57 having an annular biasing member 62 that biases the lip 58 against the contact surface 56 of the leg journal segment 23. The biasing member 62 is shown as a ring-like member, which may be constructed of metal or other suitable material and can take any other suitable form.

FIG. 3 depicts the use of an annular elongated O-ring 60 having a non-circular cross-section as a radially energized secondary seal 52. In FIG. 19, secondary seal 52 is an annular O-ring 60 having a circular cross-section that is primarily radially energized between surface 79 of the cone 18 and surface 86 of an annular lip 81 extending from the leg 20. The dynamic sliding seal interface 54 may be created between the outer surface 115 of the O-ring 60 and either, or both, of surfaces 79, 86.

Primarily axially energized secondary seals 52 are shown, for example, in FIGS. 2a, 6 and 21. When the secondary seal 52 is primarily axially energized in bit 10, the seal 52 must generally be capable of withstanding a wide range of deflection due to the significant end-play of the cone 18 relative to the leg 20. Any suitable form and configuration of seal can be used as an axially energized secondary seal 52. For example, a lip seal 57, such as shown in FIG. 2a, performs effectively as a primarily axially energized secondary seal 52. The single element lip seal 57 may take any shape and configuration suitable for use in accordance with the present invention. In the preferred embodiment of FIG. 2a, for example, the lip seal 57 is non-perforated and includes a resilient lip portion 58 with a dynamic sealing surface 55 constructed at least partially of elastomeric material. The lip seal 57 is affixed, such as by bonding, to the cone surface 41 forming groove 98. Dynamic sealing surface 55 of seal 52 creates a dynamic sliding seal interface 54 with contact surface 56 of leg 20.

In FIG. 5, the secondary seal 52 is an axially energized V-shaped annular lip seal 57 having a base 53 secured to surface 41, and a lip portion 58 for creating a dynamic sliding seal interface 54 between dynamic sealing surface 55 and contact surface 56. The base 53 provides added support and stiffness to the resilient lip portion 58. Another type of lip seal 57 that can be used as an axially energized secondary seal 52 is a lip seal, having multiple connected components, such as seal 57 shown in FIG. 4. Lip seals 57 are generally capable of providing low contact pressure at their dynamic sliding seal interfaces 54, minimizing both wear to the contact surface 56 and seal 52 and the frictional heat created thereby. Further, the lip seal 57 generally possesses flexing and deflection characteristics for effective sealing during misalignment of the cone 18 and leg 20 that occurs during drilling operations due to journal 23 flexing and cone 18 cocking, or end-play, relative to leg 20 as a result of the uneven forces placed upon the cone 18.

Figure 23:
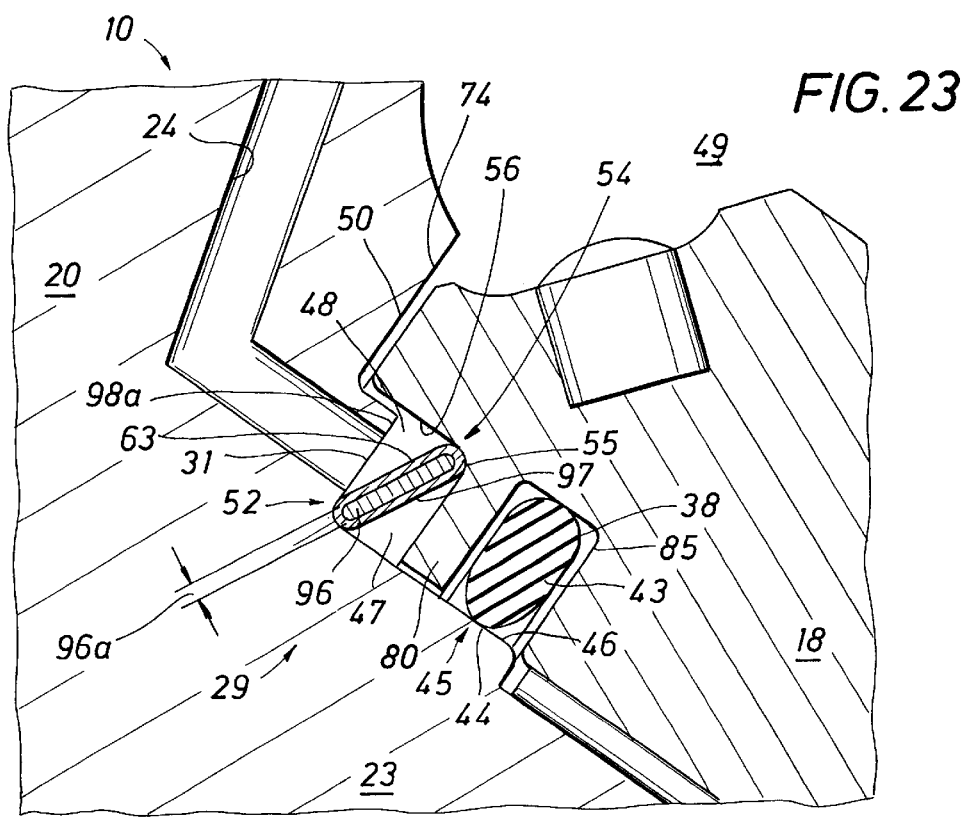
FIG. 23 is a partial cross-sectional view of one leg of a rotary cone drill bit having yet another embodiment of the present invention employing a Belleville spring secondary seal disposed in an interstice between the primary seal and a fluid conduit, the fluid conduit in fluid communication with the interstice, an annular gap and the earthen annulus.
Figure 27:
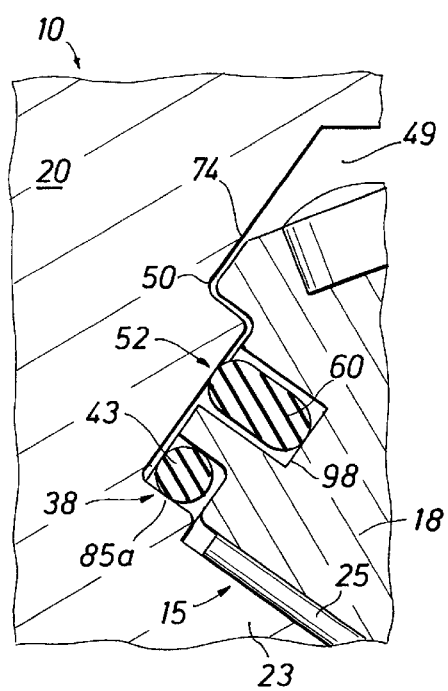
FIG. 27 is a partial cross-sectional view of another embodiment of the present invention employing a primary O-ring seal disposed in an interstice and a secondary seal disposed in a groove in the cutter cone.

Referring to FIG. 23, other seals having multiple connected components, such as bellville spring type seals 63, may be used as a primarily axially energized secondary seal 52 in accordance with the present invention. Seal 63 includes a metallic belleville spring 96 coated with elastomeric material 97. The axially energized seal 52 is shown secured against the leg 20, such as by being interference fit. Further, single element seals having a circular cross-section, such as O-ring seal 60 in FIG. 10, and having non-circular cross-sections, such as elongated O-ring seal 60 in FIG. 27, may be used as axially energized secondary seals 52.

Now referring to FIGS. 6 and 7, combination type seals 61 can be used effectively as primarily axially energized secondary seals 52. A combination type seal 61 includes one or more "dynamic sealing members" 61a having a dynamic sealing surface 55, such as rigid ring 82, and is constructed at least partially of rigid, wear resistant, non-elastomeric material, such as metal, polymers, or ceramics. Combination type seals 61 also include one or more energizing members 61b, such as O-ring 60, capable of biasing the dynamic sealing member 61a into engagement with another surface, such as contact surface 56 of leg 20. The term "energizing member" as used herein means any suitable device capable of providing and maintaining force, such as with a spring constant, against a dynamic sealing member in accordance with the present invention. The O-ring 60 of seal 52 of FIG. 6 and 7, for example, energizes the rigid ring 82 by biasing the dynamic sealing surface 55 of the ring 82 against the leg contact surface 56 to form a dynamic sliding seal interface 54.

Figure 22:
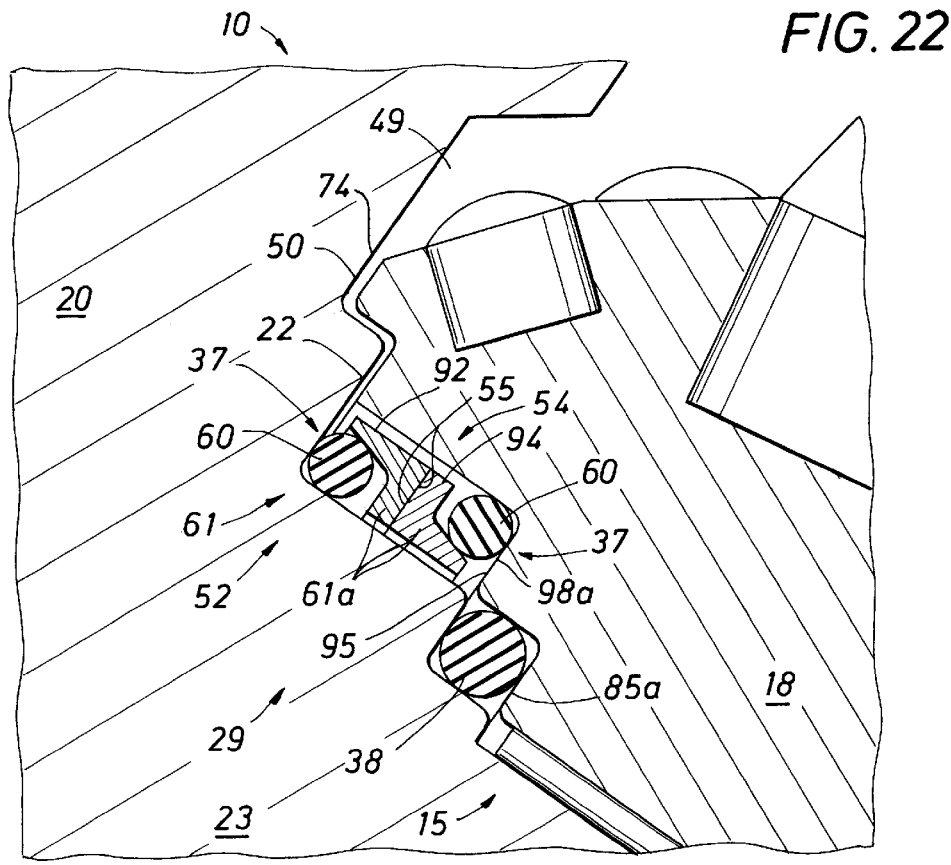
FIG. 22 is a partial cross-sectional view of one leg of a rotary cone drill bit having yet another embodiment of the present invention employing a primary seal disposed in an interstice and a secondary combination seal disposed in an interstice.

In FIGS. 21 and 22, the secondary seal 52 is an axially energized combination seal 61 and includes a pair of back to back, oppositely facing rigid rings 92, 94 as dynamic sealing member 61a. Ring 92 includes a dynamic sealing surface 55 that forms a dynamic sliding seal interface 54 with the corresponding dynamic sealing surface 55 of rigid ring 94. The rings 92, 94 are energized by elastomeric O-rings 60, which form generally static seals against the leg 20, such as leg backface surface 22, and the groove surface 41 (FIG. 21), or the cone counterbore energizing surface 95 (FIG. 22). With the use of oppositely facing rigid rings 92, 94 having a dynamic sliding seal interface 54 formed therebetween, the material of the rings 92, 94 can be selected to optimize durability and longevity.

The dynamic sealing member 61a of a combination type secondary seal 61 may be a rigid ring 82 as described above and having an L-shaped portion 82a, such as shown in FIGS. 7 and 12. In the configuration of FIG. 7, the combination seal 61 is disposed in the interstice 98a between the leg 20 and cone 18. The dynamic sealing surface 54 of the ring 82 extends between the sealing surface 55 of the ring 82 and the contact surface 56 on the leg backface surface 22. The rigid ring 82 is spaced from the leg hub non-energizing surface 145, reducing the possibility of contact between the ring 82 and surface 145, which preserves the ring 82 from wear and damage caused by such contact as the ring 82 generally rotates with the cone 18 relative to the leg 20. The space 69 formed between the ring 82 and surface 145 preferably has a width 69a equal to or greater than the deflection of the energizing member 61b.

In FIG. 12, the rigid ring 82 and energizing O-ring 60 are disposed in a groove 98 in the cone 18. The L-shaped portion 82a of the rigid ring 82 is farther from the central axis 23a of the journal segment 23 than the O-ring 60 such that the L-shaped portion 82a extends generally between the O-ring 60 and the gap 50, protecting the O-ring 60 from wear due to contact and grinding with debris entering the groove 98 from the gap 50. Further, because the rigid ring 82 generally moves with the cone 18, there being little or no relative movement between the ring 82 and cone 18, the rigid ring 82 experiences little or no contact with the non-energizing surface 145 of the groove 98 or grinding with debris against the surface 145, reducing or avoiding damage to the ring 82 therefrom. Any particles of the ring 82 that separate from the ring 82 as it wears during use will generally move out of the groove 98 and into the gap 50, protecting the energizing O-ring 60 and primary O-ring seal 43 therefrom. In another aspect of this configuration, an annular protrusion 80 can be included, providing support for the energizing O-ring 60 and the primary O-ring seal 43.

Figure 11:
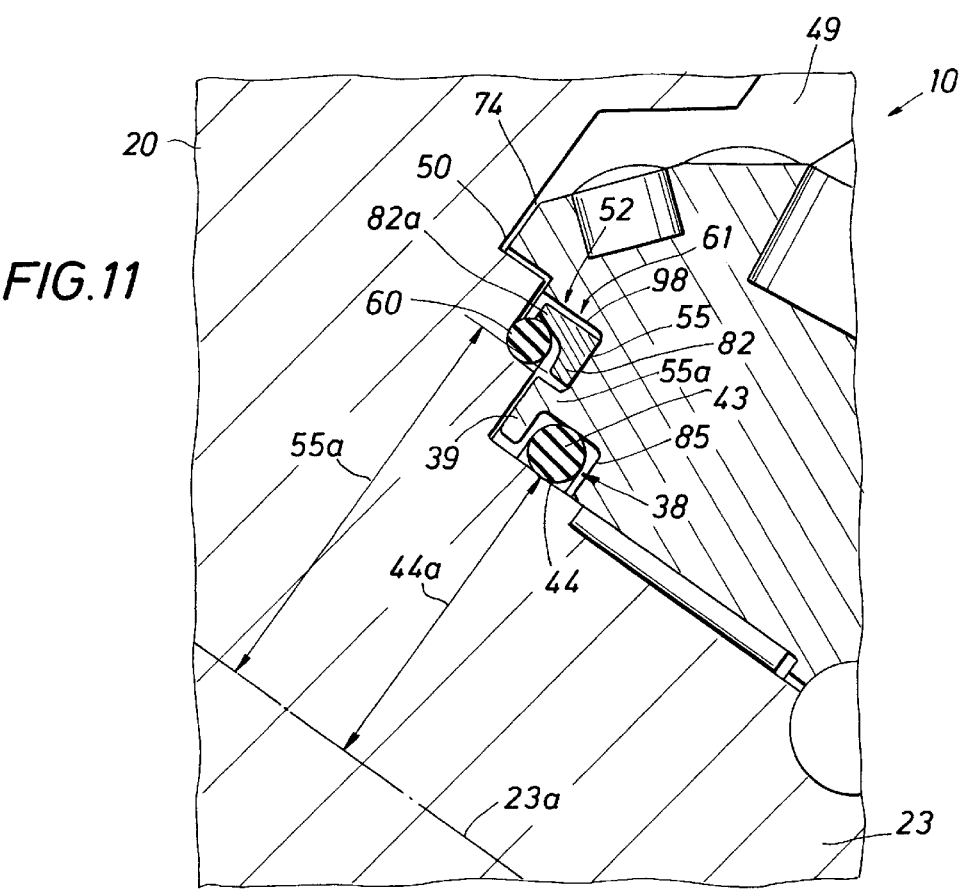
FIG. 11 is a partial cross-sectional view of another embodiment of the present invention employing a primary O-ring seal disposed in a groove in the cutter cone and a secondary combination seal also disposed in a groove in the cutter cone.
Figure 24:
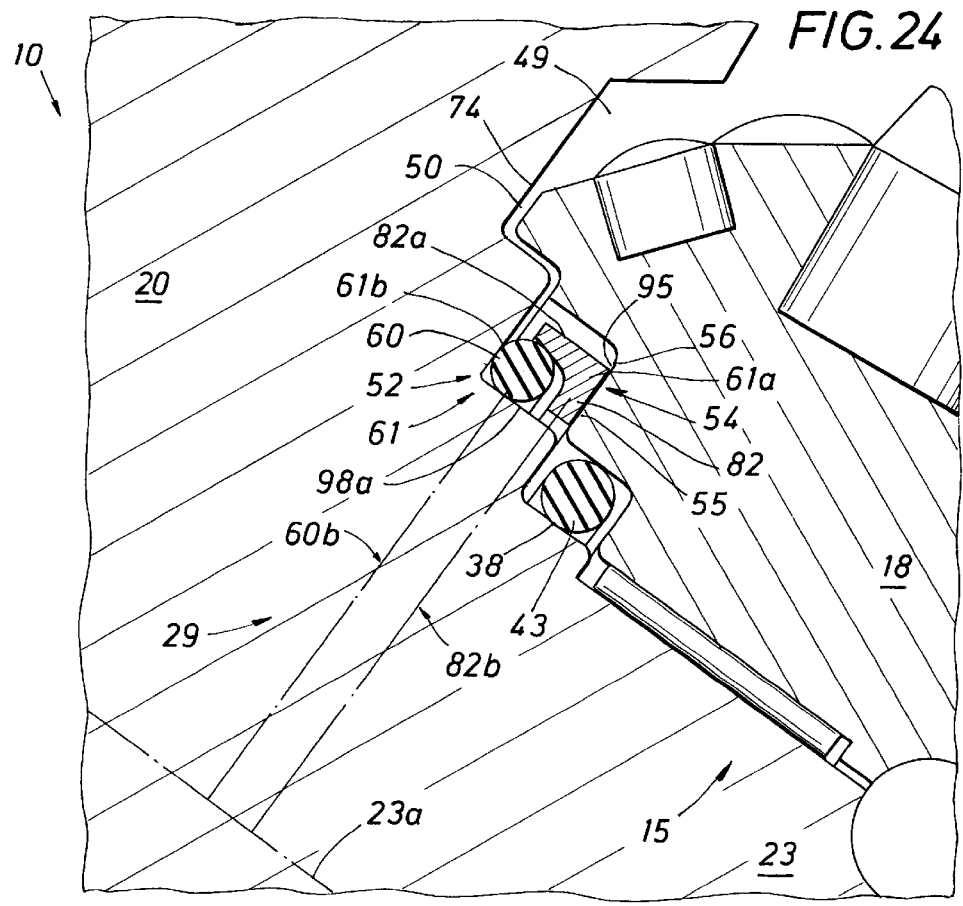
FIG. 24 is a partial cross-sectional view of another embodiment of the present invention employing a secondary seal that includes a rigid, non-elastomeric annular ring having an L-shaped cross section and an annular elongated arm portion, and an annular energizing member engageable with the annular ring.

Similar benefits may be obtained with other configurations of combination seals 61, such as those shown in FIGS. 11 and 24. In FIG. 24, the seal 61 is disposed in an interstice 98a, the dynamic sliding seal interface 54 extending between the surface 55 of the rigid ring 82 and the cone counterbore surface 95. The outer radius 82b of the ring 82 is larger than the outer radius 60b of the energizing O-ring 60, protecting the energizing O-ring 60 and primary seal O-ring 43 similarly as described above. In FIG. 11, the seal 61 is similarly oriented but disposed in a groove 98 in the cone 18. Protruding member 39 further assists in protecting the primary seal 38.

Figure 25:
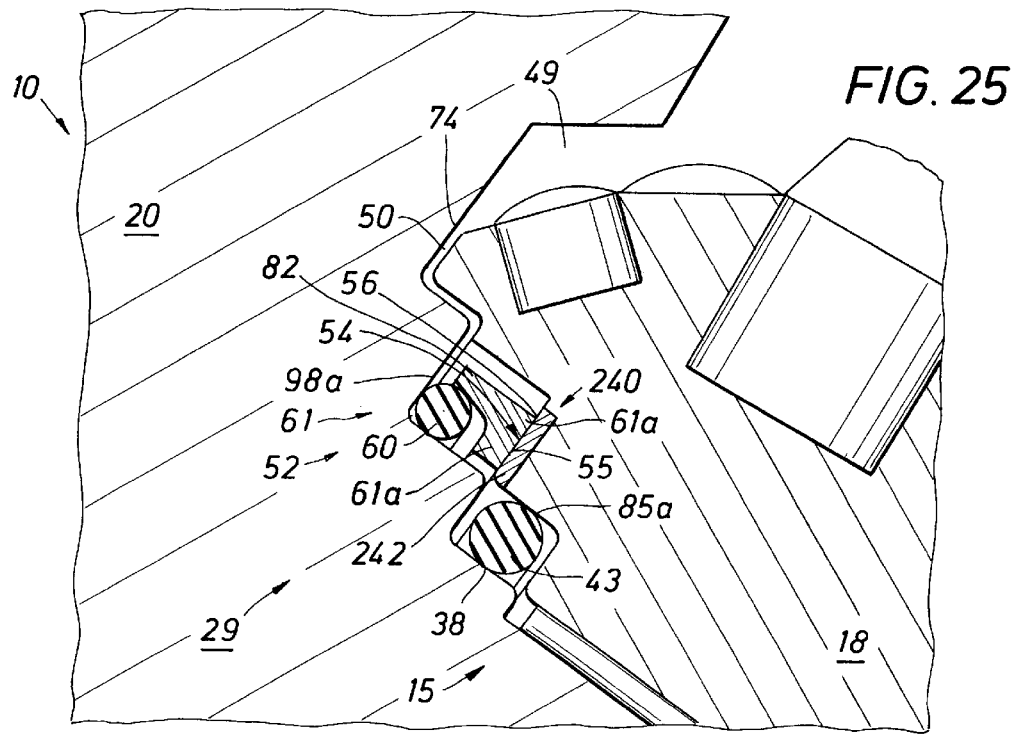
FIG. 25 is a partial cross-sectional view of yet another embodiment of the present invention employing a combination secondary seal having a rigid ring, the bit having a wear enhancer engageable with the dynamic sealing surface of the rigid ring.
Figure 26:
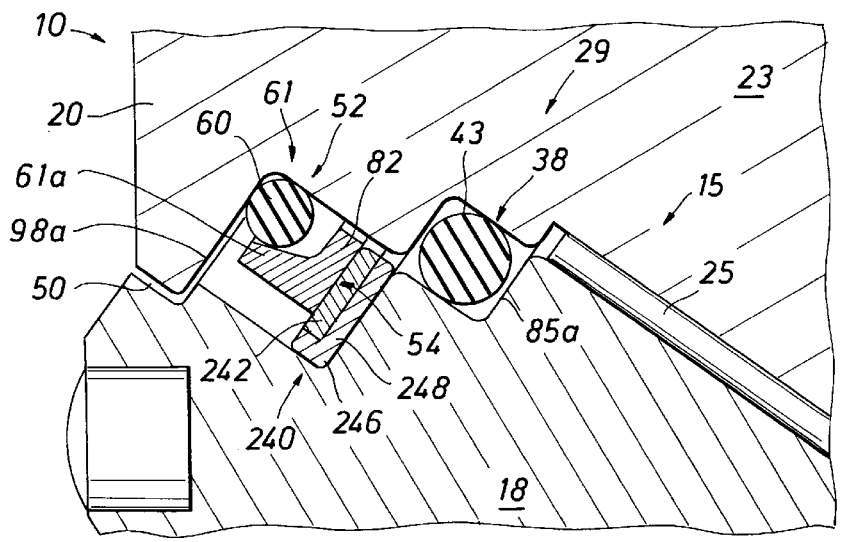
FIG. 26 is a partial cross-sectional view of another embodiment of the present invention employing a combination secondary seal having a rigid ring and an energizing member, the bit having a wear enhancer ring surrounded by elastomeric material.

FIGS. 25 and 26 illustrate the inclusion of wear enhancers 240 for forming the dynamic sliding seal interface 54 with a dynamic sealing member 61a of a combination seal 61. In FIG. 25, the wear enhancer 240 is a wear ring 242 disposed upon the cone 18 and having contact surface 56 for engagement with the dynamic sealing surface 55 of the rigid ring 82. The wear ring 242 is preferably constructed of material having high resistance to wear and a low coefficient of friction, such as, for example, carbide, or stellite. The material of the wear ring 242 can also be chosen to optimally interact with the material of the ring 82 to preserve the longevity of both elements 242, 82. The wear ring 242 may be affixed to the cone 18 with any suitable technique, such as by weld, bonding, or by interference fit, adhesives or other mechanical adherence techniques.

As shown in FIG. 26, the wear ring 242 may be surrounded or coated with elastomeric material 246, facilitating installation of the wear ring 242 and providing improved sealing between the secondary seal 52 and cone 18. The wear ring 242 is shown enclosed in an elastomeric compression ring 248, such as by bonding. The compression ring 248 is mounted in the interstice 98a against the cone 18, such as by interference fit, with the use of adhesives or other suitable techniques. The compression ring 248 provides a cushioning effect for the wear ring 242, isolating the wear ring 242 from cone movement and vibration, which could otherwise damage the wear ring 242. The above-described features of the embodiments of FIGS. 25 and 26 can also be used in other configurations of combinations seals 61, such as those in FIGS. 7 and 12.

In another aspect of the invention, as shown in FIG. 9, the seals 38, 52 may be disposed in the bit 10 generally such that the position 23b of the primary seal 38 along the central axis 23a of the journal segment 23 is closer to the bearing cavities 75, or bearings 25a, than the position 23c of the secondary seal 52 along the central axis 23a of the journal segment 23. Further, as shown in FIG. 5, the seal arrangement 29 may be configured such that the axial extent 38a of the primary seal 38 overlaps the axial extent 52a of the secondary seal 52, the axial overlap being identified with the numeral 265. This overlap 265 may, in some configurations, be greater than 15% of the axial extent 38a of the primary seal 38, such as shown in FIG. 6, where the axial overlap 265 is approximately 65% of the axial extent 38a of the primary seal 38. In yet another aspect of the invention, as shown in FIG. 11, the seals 38, 52 may be arranged such that their dynamic sealing surfaces 44, 55 are different distances, or radii, 44a, 55a from the central axis 23a of the journal segment 23, respectively. The use of such configurations may be included, for example, to allow for more space for the bearing system 15 and greater bearing capacity, as previously discussed.

Figure 28:
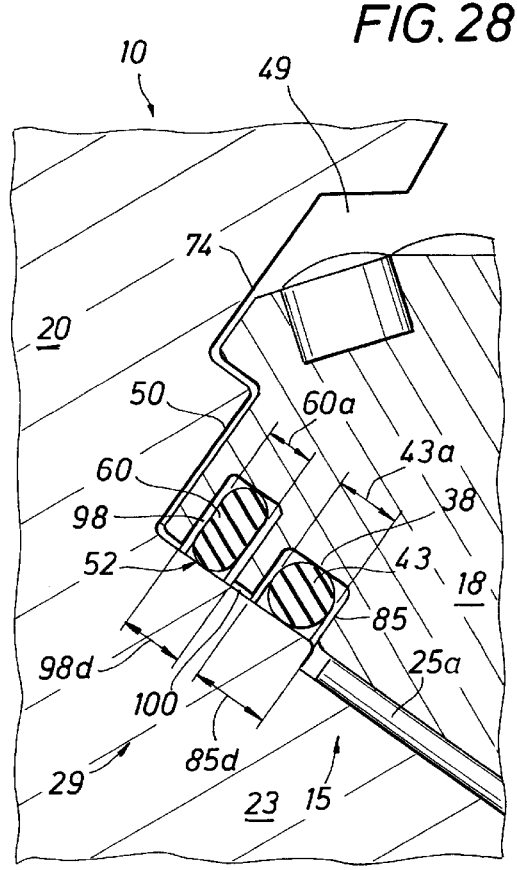
FIG. 28 is a partial cross-sectional view of another embodiment of the present invention employing a primary O-ring seal disposed in a groove in the cutter cone and a secondary elongated O-ring seal disposed in a groove in the cutter cone.

Now referring to FIGS. 28 and 29, in yet another aspect of the invention, an annular space 100 formed between the primary and secondary seals 38, 52 and between the cone 18 and leg 20 may be in fluid isolation from gap 50, bit exterior 49, lubricant reservoirs systems (not shown) in the bit 10, cone bore 73 and bit bearing system 15. The space 100 may thus be in total fluid isolation. Further, an incompressible fluid (not shown), such as grease, may be disposed within space 100 to serve as a hydrostatic pressure transmission media. For example, during drilling in a primarily liquid circulation fluid drilling environment where a significant hydrostatic head is anticipated, such as petroleum bore hole drilling, the incompressible fluid in space 100 transmits the pressure between the bore 73 of the cone 18 or bearing system 15, and the exterior 49 of the bit 10 as the pressure varies during operations. If the space 100 is not filled with incompressible fluid, such as grease, the pressure differential could cause the seals 38, 52 to be drawn to and possibly extruded into the lower pressure space 100. Hydrostatic head" means pressure created by a column of fluid at a specific depth. The space 100 may be vacuum filled with incompressible fluid, such as through channel 222 (FIG. 29), during assembly of the bit 10, or after the seals 38, 52 are placed into the bit 10 and the leg 20 and cone 18 are connected. Once the space 100 is sufficiently filled with incompressible fluid, the channel 222 is filled, or plugged, such as with a threaded plug 222a, or a metal plug secured in channel 222 by weld, interference fit, or other conventional techniques. The inclusion of incompressible fluid or grease, however, may not be necessary in bits 10 having other uses, such as during shallow bore hole mining drilling in a primarily gaseous circulation fluid drilling environment.

Now referring to FIG. 30, in another aspect of the invention, the seal arrangement 29 may be configured so that the seals 38, 52 have different peak contact pressures. Generally, the lower the peak contact pressure on a seal, the more limited the sealing capability of the seal and the less the seal will wear; the higher the peak contact pressure, the more sealing the seal will provide and the more the seal will wear and generate heat. Because it is typically desirable that the primary seal 38 generally provide an absolute seal around the bearing system 15, the bit 10 is designed such that the peak contact pressure on the primary seal 38 is greater than the pressure in the space 100. If the peak contact pressure of the primary seal 38 is too low, fluid could pass by the seal 38 from the space 100 into the bearing system 15, contaminating the bearing system 15.

The peak contact pressure of the secondary seal 52 could be varied depending on the use of the bit 10 and the objectives of the user. In some operations, such as during drilling shallow mining bore holes in a generally gaseous circulation fluid drilling environment, it may be desirable to include a secondary seal 52 having a high peak contact pressure. One reason may be to optimize the ability of the secondary seal 52 to prevent the ingress of debris from the gap 50 to the primary seal 38. Another reason may be to have the peak contact pressure of the secondary seal 52 higher than that of the primary seal 38 if significant wear on the dynamic sealing surface 55 on the secondary seal 52 is expected.

The peak contact pressures of the seals 38, 52 can be varied or controlled by selecting the material composition of the seals 52, 38. Differing material compositions are disclosed, for example, in U.S. patent application Ser. No. 08/727,001 filed on Oct. 8, 1996, entitled "Composite Rock Bit Seal," U.S. patent application Ser. No. 09/980,917 entitled "Composite Earth Boring Bit Seal" filed concurrently with the present application on Dec. 1, 1997, and U.S. Reissue application Ser. No. 08/649,954 entitled "Composite Seal for Rotary Cone Rock Bits" and filed on Jul. 8, 1996, all of which have a common assignee with the present application and are hereby incorporated by reference in their entireties. The material composition of the seal 38, 52 will affect the peak contact pressure of a seal by varying the resistance of the seal to compression between bit components. Generally, the greater the hardness of a seal or its energizing member, the higher the spring rate of the seal, causing a higher peak contact pressure. For example, a belleville spring type seal 63 (FIG. 23) having a spring 96 constructed of metal, or spring steel, with a high modulus of elasticity will have a higher spring rate and thus generate a higher peak contact pressure than a geometrically identical seal 63 having a spring 96 constructed of one or more polymers that have a lower modulus of elasticity and spring rate.

Another way to vary or control the peak contact pressure of seals 38, 52 is by shaping the seals 38, 52. Generally, the greater the height of the seal, the lower the seal's peak contact pressure assuming the same deflection. Referring to FIG. 30a, for example, seals 60, 43 could be formed with widths 60a, 43a of 0.250" and seal 60 formed with a height 60b of 0.500." Seal 43, having a circular cross-section, would have a height 43b of 0.250". All other variables, such as material composition and seal deflection, being the same for both seals 43, 60, the elongated O-ring seal 60 would have a peak contact pressure lower than that of the seal 43. For another example, the peak contact pressure of a bellville spring type seal 63 (FIG. 23) could be increased by increasing the spring thickness 96a of the spring 96 and thus its spring rate.

Referring again to FIG. 30, the peak contact pressure on seals 38, 52 could also be controlled or varied by shaping the dynamic sealing surfaces 44, 55 of the seals 38, 52, respectively. All other variable being constant, the larger the dynamic sealing surface of a seal, the lower the peak contact pressure. The same is true for the static sealing surfaces 36a, 37a of the seals 38, 52, respectively. For example, as shown in FIG. 30b, the static sealing surface 37a of seal 60 may be smaller than its dynamic sealing surface 55, causing the peak contact pressure of the seal 52 to be greater at the static sealing surface 37a than at the dynamic sealing surface 55.

The use of seals having non-circular cross sections, such as elongated O-ring seal 60 shown in FIG. 28 and elongated O-ring seal 43 of FIG. 29, provides other benefits that may be desirable in various configurations. Generally, all other variables being equal for two seals having the same deflection, a seal having a non-circular cross-section may require a groove or interstice that is narrower than the groove or interstice necessary to carry a seal having a circular cross-section, allowing more space in the bit for other components, such as bearings 25a, and greater bearing capacity. Referring to FIG. 28, for example, if a deflection of 0.050" is desired for each seal 60, 43 where a 10% squeeze is expected, an O-ring seal 43 having a width of 0.500" would be necessary, requiring a groove 85 of sufficient width 85d to accommodate the seal 43. Because the elongated O-ring seal 60 requires only a width 60a of 0.250" to provide a deflection of 0.050" if the seal 60 has a height 60c (FIG. 30a) of 0.500", the width 98d of the groove 98 would be smaller than the width 85d of the groove 85. Now referring to FIGS. 29 and 30, in another aspect, the shape of the dynamic sealing surface 44 and static sealing surface 36a of seal 38 (FIG. 29) and dynamic and static sealing surfaces 55, 37a of seal 52 (FIG. 30) (the seals 38 and 52 having non-circular cross sections) could be specifically shaped to increase or decrease the seal's contact pressure. For example, the seal surface could be bullet-shaped, such as the static sealing surface 37a of seal 60 in FIG. 30, to increase the seal's peak contact pressure. A "bullet" seal is disclosed, for example, in U.S. application Ser. No. 08/727,275 entitled "Dual Functioning Seal for Rock Bits", filed on Oct. 8, 1996 and having a common assignee as the present application, the entire disclosure of which is incorporated by reference herein. For another example, the seal surface could be square shaped, such as surfaces 36a, 44 of seal 43 in FIG. 8, to reduce the seal's contact pressure.

Figures 30B, 31:
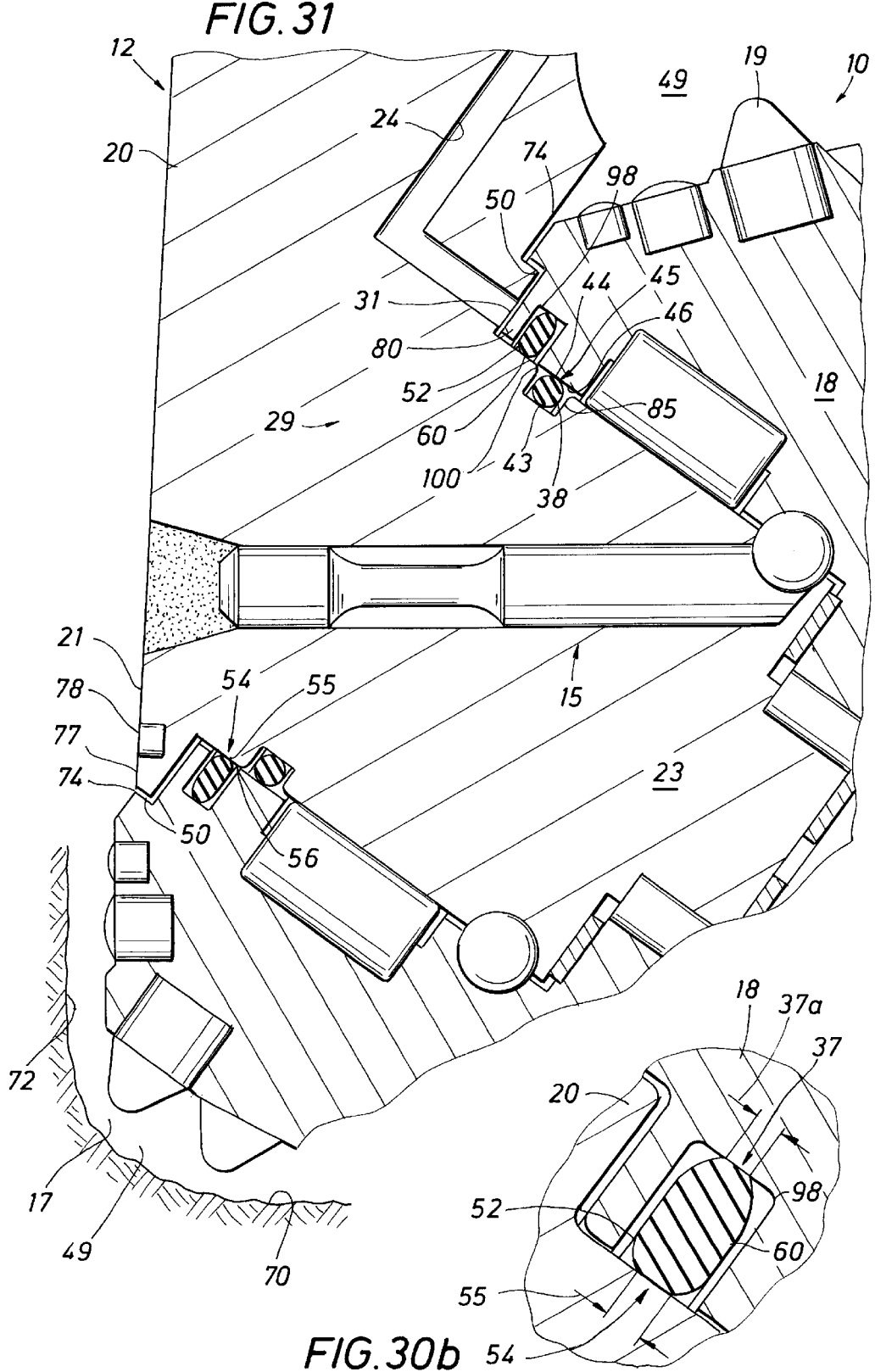
FIG. 30b is an exploded partial cross-sectional view of a secondary elongated O-ring seal disposed in a groove in the cutter cone.
FIG. 31 is a partial cross-sectional view of one leg of a rotary cone drill bit having another embodiment of the present invention similar to the configuration of FIG. 3 and including a fluid conduit in fluid communication with the annular gap formed between the cone and bit leg and between the secondary seal and earthen annulus.

In another aspect of the invention, referring to FIG. 31, one or more passages 24 may be included in the bit body 12 to allow the flow of pressurized fluid, such as air, from the plenum 13 (FIG. 2) through one or more ports 31 into the gap 50. The pressurized fluid is permitted to flow out of the gap 50 through the annular opening 74 to the exterior 49 of the bit 10 to assist in inhibiting the ingress of particles from the borehole 17 into the gap 50. The use of numerous ports 31, though not necessary for operation of the present invention, promotes uniform distribution of pressurized fluid around the circumference of the gap 50. Annular distribution of pressurized fluid outflow through the gap 50 around the entire circumference of the gap 50 assists in providing substantially 360° protection of the primary seal 38 and promotes even wear around the circumference of the secondary seal 52, increasing seal and bit longevity.

The bit 10 may be configured such that the ports 31 connect the passage(s) 24 with an annular groove 40 (FIG. 33) or space 40a (FIG. 32) formed between the cone 18 and leg 20. The groove 40 or space 40a is in fluid communication with the gap 50, is disposed between the primary seal 38 and the opening 74 and is preferably generally uniformly shaped around its circumference. The ports 31 may instead communicate directly with the groove 98 (not shown) or interstice 98a FIG. 20) that contains the secondary seal 52.

Figures 32, 33:
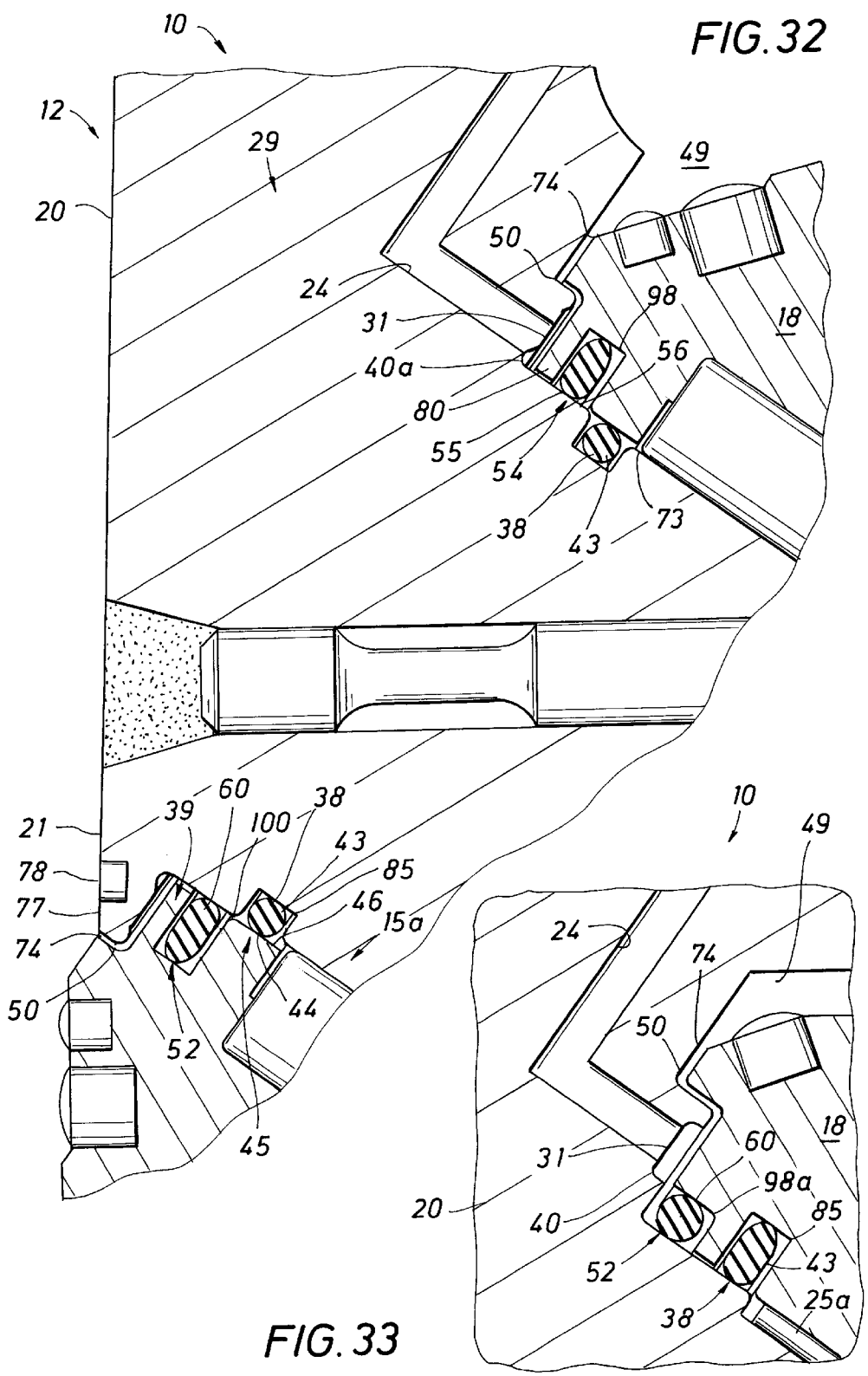
FIG. 32 is a partial cross-sectional view of one leg of a rotary cone drill bit having another embodiment of the present invention similar to the configuration of FIG. 31 and including a space in fluid communication with the fluid conduit and annular gap.
FIG. 33 is a partial cross-sectional view of one leg of a rotary cone drill bit having another embodiment of the present invention similar to the configuration of FIG. 29 and including a fluid conduit in fluid communication with a groove formed between the cone and bit leg and between the secondary seal and earthen annulus, the groove in fluid communication with the annular gap and earthen annulus.

Referring to FIGS. 32 and 33, the fluid flowing through the ports 31 and into the gap 50 is preferably substantially isolated from the primary seal 38, such that the fluid will minimally contact the primary seal 38. Importantly, during a decrease or cessation of pressurized fluid flow through the passage 24 and port 31, the secondary seal 52 of the present invention will continue to inhibit the ingress of debris from the gap 50 to the primary seal 38.

The groove 40 or 98, space 40a or interstice 98a may take any suitable shape and configuration between the cone 18 and leg 20. For example, FIG. 32 shows space 40a formed in the leg 20, while FIG. 33 shows groove 40 formed in the leg 20. It is preferable to form the groove 40 or 98, space 40a or interstice 98a without substantially reducing the mass of the leg 20 at or near the leg shirttail portion 21. Reduction of mass of the leg 20 at or near the shirttail 21 may weaken the shirttail 21 and increase its susceptibility to fracture or erosion during use. Because the shirttail 21 generally surrounds the primary seal 38 and bearing system 15, fracture to or erosion of the shirttail 21 can lead to the ingress of contaminants to the primary seal 38 and bearing system 15. Further, formation of the groove 40 or 98, space 40a or interstice 98a without reducing the leg 20 mass at or near the leg shirttail 21 permits the placement of additional wear protection, such as protective tungsten carbide inserts 78, in the leg shirttail 21 proximate to the edge 77 of the shirttail 21.

Figure 34:
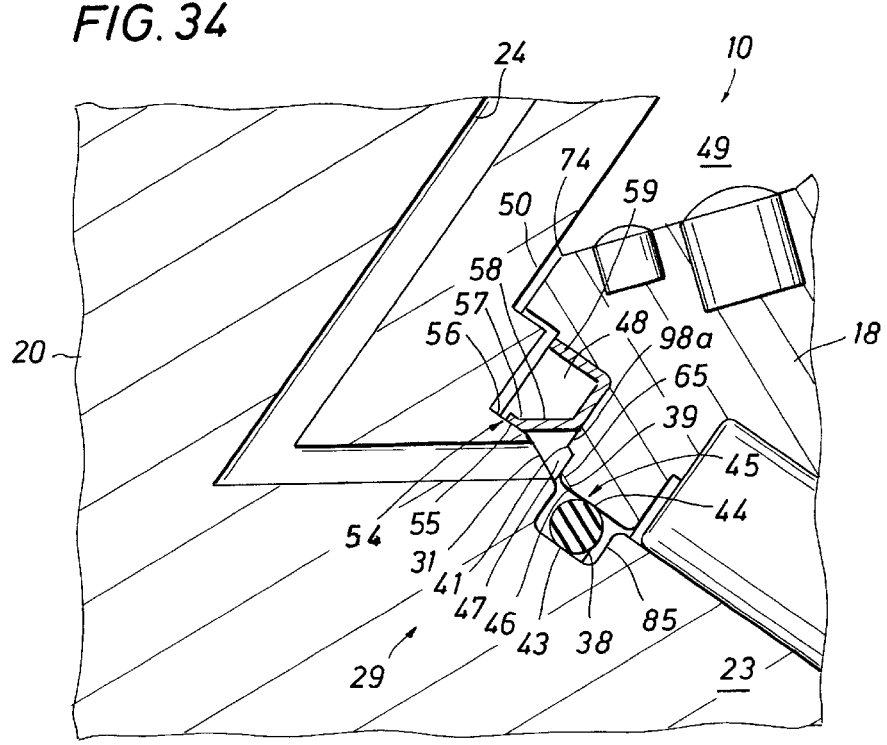
FIG. 34 is a partial cross-sectional view of one leg of a rotary cone drill bit having another embodiment of the present invention, wherein the primary seal is disposed in an annular groove formed in the leg journal segment and a secondary lip seal is disposed in an interstice between a fluid conduit and annular gap.

In further aspects of the invention, the ports 31 may be disposed between the primary and secondary seals 38, 52, such as shown in FIG. 34, or between the secondary seal 52 and the opening 74, such as shown in FIG. 23. In the former configuration, the secondary seal 52 may be used to serve as a one-way valve. For example, as shown in FIG. 34, the seal 52 may be a non-perforated, one-way lip seal 57 disposed between the ports 31 and the opening 74. In this configuration, the lip 58 of the seal 57 serves as a one-way valve, allowing the escape of pressurized fluid from the interstice 98a when the lip 58 is disengaged, while substantially preventing any inflow of particles from the gap 50 to the primary seal 38. In operation, pressurized fluid flows from the ports 31 into the interstice 98a behind the secondary seal 52, such as into an inside portion 47 of the interstice 98a. The seal 52 is situated such that the dynamic sealing surface 55 of the lip 58 is lifted, or disengaged, from the contact surface 56 by the force of the pressurized fluid on the seal lip 58 in interstice portion 47. Fluid thus opens the dynamic sliding seal interface 54, bypassing the seal 52 and passing into an outer portion 48 of the interstice 98a and the gap 50. If the fluid pressure in the inside interstice portion 47 decreases or ceases, surface 55 of the seal 52 is capable of generally remaining engaged against the contact surface 56 at the dynamic sliding seal interface 54. The seal lip 58 will scrape or slide against the contact surface 56, thus generally substantially keeping particles in the outer interstice portion 48 or gap 50 from entering the inner portion 47. Further, forces on the seal 57 from the gap 50, or outside interstice portion 48, will generally tend to urge the surface 55 of the lip 58 against the contact surface 56, assisting in preventing particle ingress into the inner interstice portion 47, the port 31, the passage 24 and primary seal 38.

Various factors can be manipulated to promote operation of the seal 52 as a one-way valve. For example, the spring constant of a lip seal 57 (FIGS. 5, 34) may be selectively established to enable, or promote, lifting of dynamic sealing surface 55 by the force of pressurized fluid flowing from the port 31. When the one-way valve type secondary seal 52 is an annular O-ring 60 (FIG. 19) or combination seal 61 (FIG. 21), the seal 52 can be configured to allow the force of pressurized fluid behind the seal 52 to disengage the dynamic seal interface 54 and escape into the gap 50. For example, the seal 52 of FIG. 19 may be situated in interstice 98a such that the dynamic seal surface 55 on the seal surface 115 will lift-off during misalignment of the cone 18 and leg 20, disengaging the dynamic sliding seal interface 54 and allowing fluid to escape from the interstice 98a into the gap 50. The one-way valve seal 52 thus allows the bypass of pressurized fluid from the passages 24 to the gap 50, while substantially inhibiting the entry of debris from the gap 50, assisting in generally protecting the primary seal 38 from contamination and the passages 24 and ports 31 from blockage thereby.

The secondary seal 52 may instead be used to provide a generally absolute seal between the port 31 and the annular opening 74. In this configuration, the seal 52 can be a non-perforated O-ring seal 60 (FIG. 19), combination seal 61 (FIG. 6), rigid lip seal (not shown) or other suitable type of annular seal. A generally absolute seal, such as between seal 60 and contact surfaces 79, 86 of FIG. 19, may be established. Any among numerous variables may be controlled to promote an absolute seal. For example, the modulus of elasticity of the component O-ring seal 60 (FIG. 19) may be established to maintain a substantially absolute seal under the predetermined, or estimated, fluid pressure in the inner portion 47 of interstice 98a, thus generally preventing the escape of fluid from and the entry of debris into the portion 47 from the gap 50. If the secondary seal 52 experiences lift-off during operations, or if the seal 52 wears or fails over time, the secondary seal 52 will thereafter operate as a one-way valve as described above.

In another aspect of the invention, an annular protruding member 39, such as, for example, cone portion 65 of FIG. 34, or flange 80 of FIGS. 32, may be included for substantially isolating the primary seal 38, or both the primary and secondary seals 38, 52, from the pressurized fluid flow from ports 31. The protruding member 39 may have any suitable composition, shape or configuration. For example, a base portion (not shown) of the secondary seal 52 extending between the port 31 and the primary seal 38 may serve as the protruding member 39.

The protruding member 39 may also bias the pressurized fluid flow from the ports 31 into the gap 50 in various embodiments of the invention, such as, for example, the configurations shown in FIG. 32. In FIG. 32, the secondary seal 52 is disposed, such as by being slip fit, in a secondary seal groove 98 in the cone 18 between the space 40a and primary seal 38. The radially energized seal 52 creates a dynamic sliding seal interface 54 between the primarily elastomeric dynamic sealing surface 55 of the seal 52 and journal contact surface 56 as the seal rotates with the cone 18 relative to the journal 23. The seal 52, which may take any suitable form, such as elongated O-ring 60, generally substantially prevents the ingress of debris to the primary seal 38 from the gap 50. The protruding member is a flange 80, which generally substantially isolates the primary and secondary seals 38, 52 from the pressurized fluid flow in the passage 24, space 40a and gap 50, and generally biases the pressurized fluid from the space 40a into the gap 50.

FIGS. 20, 23 illustrate the ports 31 disposed between the secondary seal 52 and the opening 74. In this configuration, the secondary seal 52 is capable of generally remaining energized throughout operations at dynamic sliding seal interface 54 and substantially sealing the primary seal 38 from the passages 24, ports 31 and gap 50. In this instance, pressurized fluid flows through the passages 24 to the gap 50 between the secondary seal 52 and the opening 74. The secondary seal 52 may serve to bias, or encourage, the pressurized fluid flow into the gap 50 and away from the primary seal 38, isolating the primary seal 38 from the fluid flow. A separate annular protruding member 39, such as flange 80 (FIG. 23), may still be included, assisting in isolating the primary seal 38. The seal 52 is thus capable of promoting the uniform exhaust of fluid into the gap 50 around the circumference of the gap 50, generally providing substantially 360° protection of the primary seal 38 from contamination. Further, this configuration may assist in preventing the build-up of debris around the secondary seal 52, reducing wearing and crushing of the seal 52 thereby. In addition, when the pressurized fluid supplied through passage 24 contains liquid, such as water, the liquid will assist in washing debris away from the secondary seal 52 and cooling the secondary seal 52.

Figure 35:
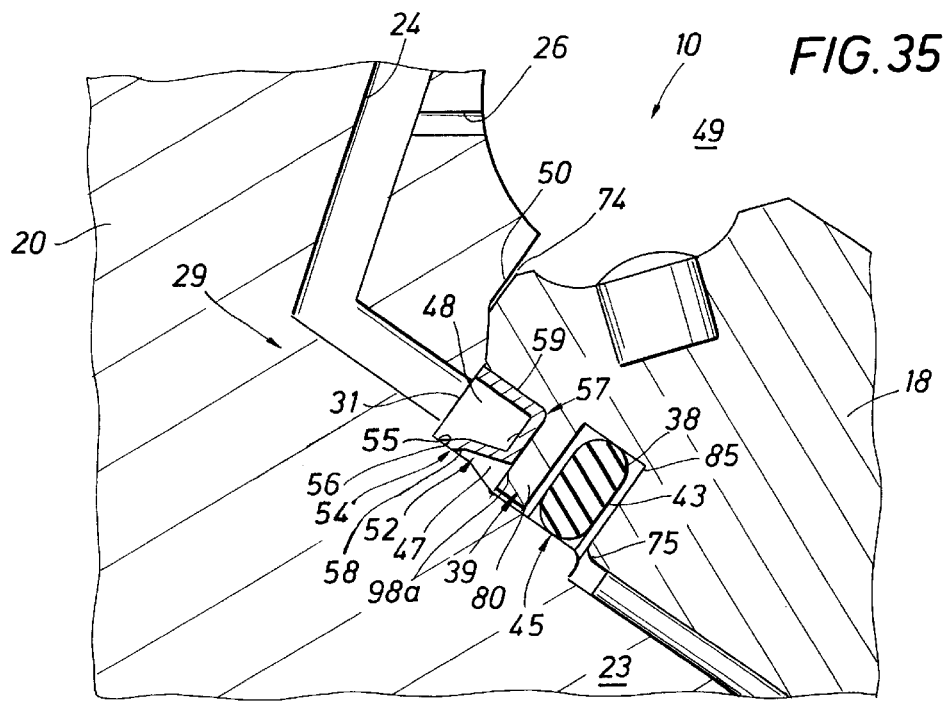
FIG. 35 is a partial cross-sectional view of one leg of a rotary cone drill bit having another embodiment of the present invention employing a secondary lip seal disposed in an annular interstice between the primary seal and a fluid passage.

Any suitable type of secondary seal 52 may be used in this configuration. FIG. 35, for example, illustrates the use of secondary lip seal 57 that, unlike the lip seal 57 of FIG. 34, does not function as a one-way valve. The dynamic sealing surface 55 of the seal lip 58 forms the dynamic sliding seal interface 54 against journal contact surface 56, the seal 52 being primarily radially energized. The fluid flowing through the port 31 into interstice portion 48 is exhausted into gap 50. In FIG. 20, the secondary lip seal 57 is generally similarly located in the interstice 98a as the lip seal 57 of FIG. 35, but includes a biasing member 62, such as a metal ring, disposed about the lip portion 58 for biasing the dynamic sealing surface 55 against the contact surface 56 to encourage absolute sealing. Other types of lip seals 57, such as the seals 57 shown in FIGS. 5 and 16, may likewise be used in this configuration. In FIG. 23, an axially energized annular Belleville type spring seal 63 is shown in this general configuration. Likewise, an O-ring 60 (FIG. 19) or combination type seal 61 (FIG. 21) may be used as a secondary seal 52 in this configuration.

As is well known in the art, it is generally desirable to reduce the amount of frictional heat generated by bearing system seals to minimize heat related damage to the lubricant, seals and other bit components, and to promote bit longevity. In accordance with various embodiments of the present invention utilizing a fluid cleaning capability as described above, frictional heat generated by the secondary seal 52 is substantially removed by pressurized fluid flow through ports 31 and into grooves 40 or 98, space 40a or interstice 98a, such as the embodiments of FIGS. 34 and 35. Pressurized fluid flow may also remove some of the frictional heat produced by the primary seal 38 in various embodiments of the invention, such as in FIG. 6. Further, in embodiments where the secondary seal 52 acts as a one-way valve, such as described above with respect to FIG. 34, substantially no frictional heat may be produced by the secondary seal 52 when the seal 52 is deenergized, assisting in further reducing seal 52 and contact surface 56 wear. Any reduction in frictional heat is particularly significant for bits 10 having friction bearing systems (not shown) because such systems generally possess higher internal operating temperatures than roller bearing type systems, warranting a heightened need to reduce frictional heat.

The pressurization of the groove 40 (FIG. 33), groove 98 (not shown), space 40a (FIG. 32) or interstice 98a (FIG. 35) and the flow rate of the exiting fluid in the gap 50, may be controlled by controlling the supply fluid pressure with conventional means (not shown). Further, the spring constant of secondary lip seals 57 and the modulus of elasticity, and deflection, of secondary seal O-rings 60 may be varied. Additionally, one or more flow control ports 26 (FIG. 35) may be formed into leg 20 to release excessive fluid pressure from the passage 24, though not necessary for operation of the present invention. Any combination of these and other factors may be varied to effect groove pressurization, while no single factor need necessarily be varied for operation of the present invention.

Each of the foregoing aspects of the invention may be used alone or in combination with other such aspects and many aspects are interchangeable. The embodiments described herein are exemplary only and are not limiting of the invention, and modifications thereof can be made by one skilled in the art without departing from the spirit or teachings of this invention. Many variations of the embodiments described herein are possible and within the scope of the invention. For example, the secondary seal 52 of FIG. 7 could be used in the bit configuration of FIG. 27. Accordingly, the scope of protection is not limited to the embodiments described herein.

What is claimed is:

1. A drill bit for use in an earthen annulus that contains loose particles, the drill bit connected to a fluid supply source comprising:

a bit body having at least one journal segment, said bit body further having at least one fluid conduit in fluid communication with the fluid supply source;

a roller cone rotatably mounted upon said journal segment and forming at least one bearing cavity therebetween;

an annular primary seal disposed between said roller cone and said bit body and between said bearing cavity and the earthen annulus;

an annular gap disposed between said roller cone and said bit body and between said annular primary seal and the earthen annulus, said annular gap in fluid communication with said fluid conduit and the earthen annulus; and an annular secondary seal disposed between said annular primary seal and the earthen annulus, said annular secondary seal being primarily radially energized.

2. The drill bit of claim 1 wherein said annular secondary seal includes a sealing lip having a dynamic sealing surface constructed at least partially of elastomeric material.

3. The drill bit of claim 2 wherein said annular secondary seal is capable of providing a substantially absolute seal.

4. The drill bit of claim 1 wherein said annular secondary seal is disposed between said fluid conduit and said annular primary seal.

5. The drill bit of claim 1 wherein said annular secondary seal is capable of permitting fluid flow from said fluid conduit into said annular gap and substantially preventing the passage of debris from said annular gap to said annular primary seal.

6. The drill bit of claim 5 wherein said annular secondary seal includes a one-way valve.

7. The drill bit of claim 1 wherein said bit body further includes an annular groove disposed between said cone and said bit body and between said annular primary seal and the earthen annulus, wherein said annular groove is in fluid communication with said fluid conduit and said annular gap.

8. The drill bit of claim 7 wherein said annular secondary seal is disposed between said fluid conduit and said annular primary seal.

9. The drill bit of claim 8 wherein said annular secondary seal is disposed at least partially within said annular groove.

10. The drill bit of claim 9 wherein said annular secondary seal includes a sealing lip having a dynamic sealing surface constructed at least partially of elastomeric material.

11. The drill bit of claim 9 wherein said annular secondary seal is capable of permitting fluid flow from said annular groove into said annular gap and substantially preventing the passage of debris from said annular gap to said annular primary seal.

12. The drill bit of claim 1 wherein said bit body further includes an annular interstice disposed between said cone and said bit body and between said annular primary seal and the earthen annulus, wherein said annular interstice is in fluid communication with said fluid conduit and said annular gap.

13. The drill bit of claim 12 wherein said annular secondary seal is disposed at least partially within said annular interstice.

14. The drill bit of claim 13 wherein said annular secondary seal is capable of permitting fluid flow from said annular interstice into said annular gap and substantially preventing the passage of debris from said annular gap to said annular primary seal.

15. A drill bit for use in an earthen annulus that contains loose particles, the drill bit connected to a circulation fluid supply source comprising:
   a bit body having at least one journal segment and at least one fluid conduit in fluid communication with the fluid supply source;
   at least one roller cone rotatably mounted upon said journal segment and forming at least one bearing cavity therebetween;
   an annular primary seal disposed between said roller cone and said bit body and between said bearing cavity and the earthen annulus;
   an annular gap disposed between said roller cone and said bit body and between said annular primary seal and the earthen annulus, said annular gap in fluid communication with said fluid conduit and the earthen annulus; and
   an annular non-perforated secondary seal disposed between said annular primary seal and the earthen annulus, said annular non-perforated secondary seal having a dynamic sealing surface constructed at least partially of elastomeric material.

16. A drill bit for use in an earthen annulus that contains loose particles, the drill bit associated with a circulation fluid supply source, comprising:
   a bit body having at least one conduit in fluid communication with the fluid supply source;
   at least one roller cone rotatably mounted upon said bit body and forming at least one bearing cavity therebetween;
   an annular primary seal disposed between said roller cone and said bit body;
   an annular gap disposed between said cone and said bit body and between said annular primary seal and the earthen annulus, said annular gap in fluid communication with the earthen annulus;
   an annular interstice disposed between said roller cone and said bit body and between said annular gap and said annular primary seal, said annular interstice in fluid communication with said conduit and said annular gap; and
   an annular secondary seal disposed at least partially within said annular interstice, said annular secondary seal capable of substantially preventing the ingress of particles from said annular gap to said annular primary seal throughout disposition of the drill bit in the earthen annulus.

17. A rotary cone drill bit for use in an earthen annulus that contains loose particles, the drill bit associated with a circulation fluid supply source, comprising:
   a bit body having at least one conduit in fluid communication with the fluid supply source;
   at least one roller cone rotatably mounted upon said bit body and forming at least one bearing cavity therebetween;
   an annular primary seal disposed between said cone and said bit body, said annular primary seal capable of sealing said bearing cavity;
   an annular gap disposed between said cone and said bit body and between said annular primary seal and the earthen annulus, said annular gap in fluid communication with the earthen annulus;
   an annular space disposed between said cone and said bit body and between said annular primary seal and the earthen annulus, said annular space in fluid communication with said annular gap and having at least one port in fluid communication with said conduit, said port capable of allowing the flow of fluid into said annular space from said conduit; and
   an annular secondary seal disposed between said port and said annular gap, said secondary seal including a one-way valve capable of permitting the flow of fluid from said annular space into said annular gap and substantially inhibiting the ingress of particles from said annular gap to said annular primary seal.

18. A drill bit for use in an earthen annulus that contains loose particles, the drill bit associated with a circulation fluid supply source, comprising:
   a bit body having at least one conduit in fluid communication with the fluid supply source;
   at least one roller cone rotatably mounted upon said bit body and forming at least one bearing cavity therebetween;
   an annular primary seal disposed between said roller cone and said bit body, said annular primary seal capable of sealing said bearing cavity;
   an annular gap formed between said roller cone and said bit body and in fluid communication with the earthen annulus;
   an annular space disposed between said annular primary seal and the earthen annulus, said annular space in fluid communication with said annular gap and said conduit; and
   an annular non-perforated secondary seal disposed between said annular space and the earthen annulus, said annular non-perforated secondary seal capable of substantially sealing said annular space from the earthen annulus.

* * * * *